(12) United States Patent
Tanner et al.

(10) Patent No.: US 10,869,041 B2
(45) Date of Patent: Dec. 15, 2020

(54) VIDEO CLUSTER ENCODING FOR MULTIPLE RESOLUTIONS AND BITRATES WITH PERFORMANCE AND QUALITY ENHANCEMENTS

(71) Applicant: Intel Corporation, Santa Clara, CA (US)

(72) Inventors: Jason Tanner, Folsom, CA (US); Jill Boyce, Portland, OR (US); David Steffy, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/369,937

(22) Filed: Mar. 29, 2019

(65) Prior Publication Data

US 2019/0230365 A1    Jul. 25, 2019

(51) Int. Cl.
| | |
|---|---|
| *H04N 19/159* | (2014.01) |
| *H04N 19/30* | (2014.01) |
| *H04N 19/176* | (2014.01) |
| *H04N 19/139* | (2014.01) |
| *H04N 19/33* | (2014.01) |
| *H04N 19/59* | (2014.01) |
| *H04N 19/513* | (2014.01) |
| *H04N 19/119* | (2014.01) |
| *H04N 19/122* | (2014.01) |
| *H04N 19/105* | (2014.01) |
| *H04N 19/196* | (2014.01) |
| *H04N 19/96* | (2014.01) |

(52) U.S. Cl.
CPC ......... *H04N 19/159* (2014.11); *H04N 19/105* (2014.11); *H04N 19/119* (2014.11); *H04N 19/122* (2014.11); *H04N 19/139* (2014.11); *H04N 19/176* (2014.11); *H04N 19/196* (2014.11); *H04N 19/30* (2014.11); *H04N 19/33* (2014.11); *H04N 19/513* (2014.11); *H04N 19/59* (2014.11); *H04N 19/96* (2014.11)

(58) Field of Classification Search
CPC ...... H04N 19/159; H04N 19/33; H04N 19/59; H04N 19/96; H04N 19/513; H04N 19/30; H04N 19/176; H04N 19/119; H04N 19/122; H04N 19/105; H04N 19/139; H04N 19/196
See application file for complete search history.

(56) References Cited

U.S. PATENT DOCUMENTS

| | | | | |
|---|---|---|---|---|
| 2004/0213345 | A1* | 10/2004 | Holcomb | H04N 19/527 375/240.03 |
| 2010/0158126 | A1* | 6/2010 | Bai | H04N 21/234309 375/240.16 |
| 2017/0041605 | A1* | 2/2017 | Watanabe | H04N 19/15 |
| 2017/0289566 | A1* | 10/2017 | He | H04N 19/52 |

* cited by examiner

*Primary Examiner* — Jared Walker
(74) *Attorney, Agent, or Firm* — Green, Howard & Mughal LLP.

(57) ABSTRACT

Techniques related to video cluster encoding are discussed. Such techniques include encoding the video at a first resolution and first bitrate, translating block based coding parameters corresponding thereto to block based encode controls for encode of the same video at a second resolution or a second bitrate, and encoding the video at the second resolution and/or bitrate using the encode controls.

24 Claims, 9 Drawing Sheets

VIDEO CLUSTER ENCODING FOR MULTIPLE RESOLUTIONS AND BITRATES WITH PERFORMANCE AND QUALITY ENHANCEMENTS

BACKGROUND

In video compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

In some contexts, large batches of videos are encoded such that each video (e.g., each piece of content) is encoded in multiple resolutions, bitrates, frame rates, etc. For example, a streaming video service may encode a single video having a resolution 4K clips at 4K resolution with a frame rate of 60 fps, 1080p resolution with a frame rate of 60 fps, 1080p resolution with a frame rate of 30 fps, 720p resolution with a frame rate of 30 fps, 480p resolution with a frame rate of 30 fps, and so on with all of those resolutions encoded at, for example, 10 different bitrates such that the streaming experience can be optimized based on device resolution, available bandwidth, internet connection speed, to give an optimal viewing experience for the user even in a dynamic context. It may be advantageous to improve video encode in such large batch encode context to provide improved compression efficiency, video quality, and/or processing time and efficiency of the encode. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
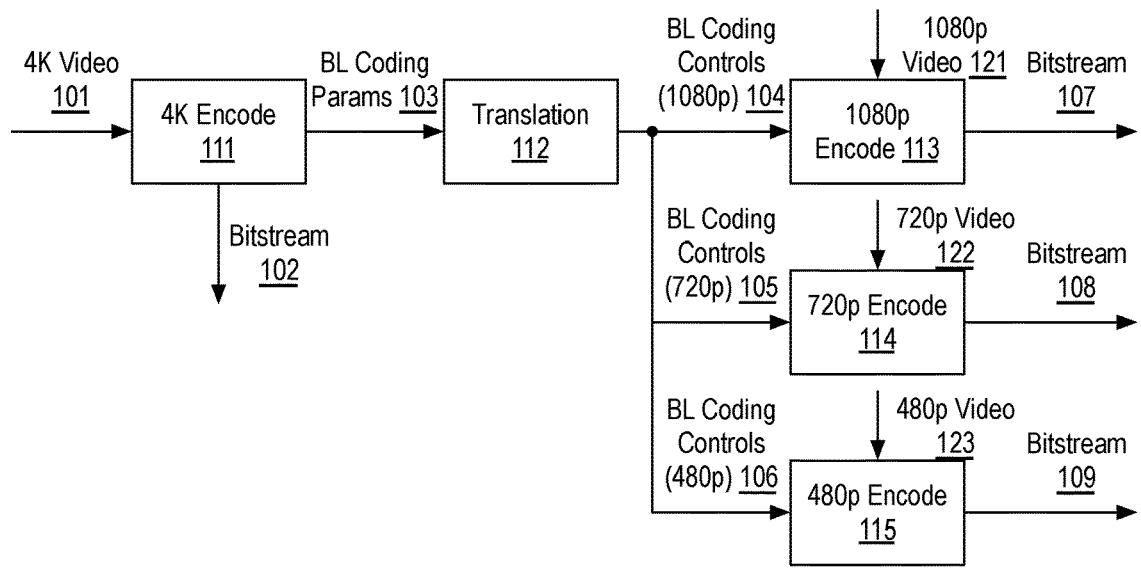
FIG. 1 is an illustrative diagram of an example system for coding a video to multiple independent bitstreams.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to video coding and, in particular, to video cluster encoding for multiple resolutions and bitrates with enhanced performance and quality.

As described above, it may be advantageous to encode large batches of videos such that a particular video (e.g., a particular piece of video content) is encoded in multiple resolutions, bitrates, frame rates, etc. In some embodiments, a video is encoded at a first resolution and a first bitrate to generate block based coding parameters for the video as well as a first bitstream. For example, the encode may generate a standards compliant bitstream. Furthermore, the encode generates block based coding parameters that include, for example, for a particular block at the first resolution one or more of a size of the block, a coding mode of the block (e.g., inter, intra, skip, merge), a motion vector for the block, an intra mode for the block, a coding unit partitioning of the block (i.e., defining the coding unit sizes and shapes within the block), and a transform unit depth or partitioning of the block (i.e., defining the sizes and shapes of transform units for the block). As used herein, the term coding parameters includes any such parameters that may be used to encode a block.

The block based coding parameters at the first resolution and the first bitrate are then translated from the first encode and then translated to block based encode controls for encode of the video at a second resolution or a second bitrate. As used herein the term encode controls includes any data structure or indicators that restrict encode decisions by setting the encode decision (such that the decision is not evaluated at the encode but is simply used) or by setting a restriction that limits evaluation of options at the encode. For example, such limits on evaluation may restrict block evaluation to only intra modes (while inter modes are not checked), to only inter modes (while intra modes are not checked), to only particular types of intra modes, to motion search only within a confined region around a motion vector or to only fractional motion vector search around an integer motion vector, to only evaluating particular partitions of a block for coding mode evaluation, to only evaluating particular transform unit split depths (e.g., only particular partitions of coding units for best transform unit size), and so on. Such encode controls are generated from a first block in the first encode and translated for use by a second block in the second encode that corresponds to the first block. As used herein the term corresponding with respect to blocks indicates the blocks are fully or partially spatially collocated in their respective frames (scaled as needed when the video size has been scaled) and temporally collocated in their respective videos.

The block based encode controls are then used to encode the same video at a second resolution or a second bitrate to generate a second bitstream. Notably, the second bitstream is independent of the first bitstream such that the entirety of the second bitstream is sufficient to decode the video at the second resolution and second bitrate. That is, the second bitstream does not rely in any way on the first bitstream for decode of the video. Furthermore, as discussed, the first and second bitstreams represent the same video content such that the same video (at different resolutions and/or bitrates) may be independently decoded using the first and second bitstreams.

The techniques discussed herein use heuristics from one encode to enhance the performance and, in some cases, the quality of the encode for the remaining modified encodes (i.e., modified by bitrate, resolution, etc.). Such techniques may speed up the remaining encodes for improved performance. In some contexts, improvement of 50% or more is attainable with a quality impact of only 2%. Furthermore, the techniques discussed herein simplify dynamic scheduling to ensure encode can complete in target time frames. As discussed further herein, a first encode of a scaled video (e.g., where 4 k is to be encoded and 1080p, 720p, and 480p will also be encoded) reports statistics and block based coding parameters at, for example, the coding unit (CU) level for the future encodes. For example, motion vectors and block sizes may be scaled for the other resolutions and modes to be checked may be defined for the subsequent encode. Such block based encode controls are provided as an interface to future encodes to optimize the performance for those blocks by not checking options that are known from the first encode to be poor candidates.

FIG. 1 is an illustrative diagram of an example system 100 for coding a video to multiple independent bitstreams, arranged in accordance with at least some implementations of the present disclosure. As shown in FIG. 1, system 100 includes a 4K encode module 111, a translation module 112, a 1080p encode module 113, a 720p encode module 114, and a 480p encode module 115. Although illustrated with respect to 4K, 1080p, 720p, and 480p encode modules for the sake of clarity of presentation, any suitable resolutions may be used. Furthermore, encode modules for the encode of differing bitrates, frame rates, etc. may also be employed. Each of 4K encode module 111, 1080p encode module 113, 720p encode module 114, and 480p encode module 115 are illustrated separately for the sake of clarity. However, such modules may be implemented in the same or different encode software, hardware, firmware, etc. Notably, the encodes performed by 1080p encode module 113, 720p encode module 114, and 480p encode module 115 may be performed at least partially simultaneously using different modules or they may be performed serially using the same or different modules.

System 100 provides video compression and system 100 may be a portion of a video encode system implemented via a computer or computing device such as a server system or the like. For example, system 100 receives video data and generates independent bitstreams 102, 107, 108, 109 that may be decoded by a decoder to generate a decompressed version of the video data. Bitstreams 102, 107, 108, 109 may be compatible with a video compression-decompression (codec) standard such as, for example, HEVC (High Efficiency Video Coding/H.265/MPEG-H Part 2). Although discussed herein with respect to HEVC, the disclosed techniques may be implemented with respect to any codec such as AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8NP9/AV1 family of codecs, etc. System 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform. Although illustrated with respect to four bitstreams, system 100 may generate any number of bitstreams having various resolutions, bitrates, frame rates, etc. such as dozens or even over 100 bitstreams. Such bitstreams may be subsequently transmitted, optionally dynamically, to decode devices for consumption by users. Notably, such bitstreams allow tailored delivery of video content based on the decode device, transmission bandwidth, and other factors. Such bitstreams are also advantageous in other contexts such as video conferencing where multiple users may be connected to a single presentation that needs to be broadcast out in real time.

System 100 may include other modules not shown for the sake of clarity of presentation. For example, system 100 may include a downsampler to downsample 4K video 101 to 1080p video 121, 720p video 122, and 480p video 123. Furthermore, each of 4K encode module 111, 1080p encode module 113, 720p encode module 114, and 480p encode module may include encode modules such as an encode controller, a transform module, a quantization module, an intra prediction module, an inter prediction module, a reference picture buffer, a scanning module, an entropy encoder, etc., some of which are discussed herein with respect to FIG. 11. Such modules are known to those of skill in the art and are not discussed further herein with respect to FIG. 1 for the sake of clarity in presentation.

As shown, system 100 receives 4K video 101 (or video at any suitable resolution) and 4K encode module 111 encodes 4K video 101 to generate a bitstream 102 and block level coding parameters 103. Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), or 4K resolution video, or the like, and the video may include any number of video frames, sequences of video frames, pictures, groups of pictures, or the like. Techniques discussed herein are discussed with respect to frames, blocks, and sub-blocks having various shapes for the sake of clarity of presentation. As used herein, a block may be any size and shape such that it includes a plurality of pixel samples (typically square or rectangular) in any suitable color space such as YUV. Furthermore a block may have sub-blocks, which also may be characterized as blocks herein. However, such frames may be characterized as pictures, video pictures, sequences of pictures, video sequences, etc., such blocks may be characterized as largest coding units, coding units, coding blocks, macroblocks, sub-units, sub-blocks, etc. For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data. For example, a block may be a coding unit or a partition thereof. In the context of the High Efficiency Video Coding (HEVC), the HEVC standard defines a coding tree unit (CTU) for a picture (e.g., a video frame of a video sequence) that may be partitioned into coding units (CUs) that take the form of rectangular blocks having variable sizes. Such coding units may be used as the basic unit or block for coding. Such coding units may be partitioned into transform units (TUs) for transform that also take the form of rectangular blocks (typically square) having variable sizes. However, as discussed, the block of video data may include any block of video data and any coding standard may be used.

Bitstream 102 may be any bitstream representative of video 101 such as an HEVC compliant bitstream. During encode of frames of video 101, any number of coding modes, coding unit partitions, transform unit partitions, and so on are evaluated to arrive at final coding modes for blocks of video 101. Such final coding modes for blocks of video 101 as well as other information and coding statistics are provided in block level coding parameters 103. Block level coding parameters 103 may include any suitable data. In an embodiment, block level coding parameters 103 include block based coding parameters such that the coding parameters indicate encode decisions used to encode the block. As used herein, the term block based indicates the corresponding data corresponds to a particular block. In an embodiment, block level coding parameters 103 includes coding unit (CU) level data including, for each block or coding unit, one or more of CU size, transform unit (TU) size, coefficients (i.e., transformed and quantized residuals), motion vectors (my), coding mode (i.e., inter, intra, single my, bidirectional, etc.), intra direction, and a best candidates list. Such block level coding parameters 103 may be stored to a memory of system 100.

Figure 2:
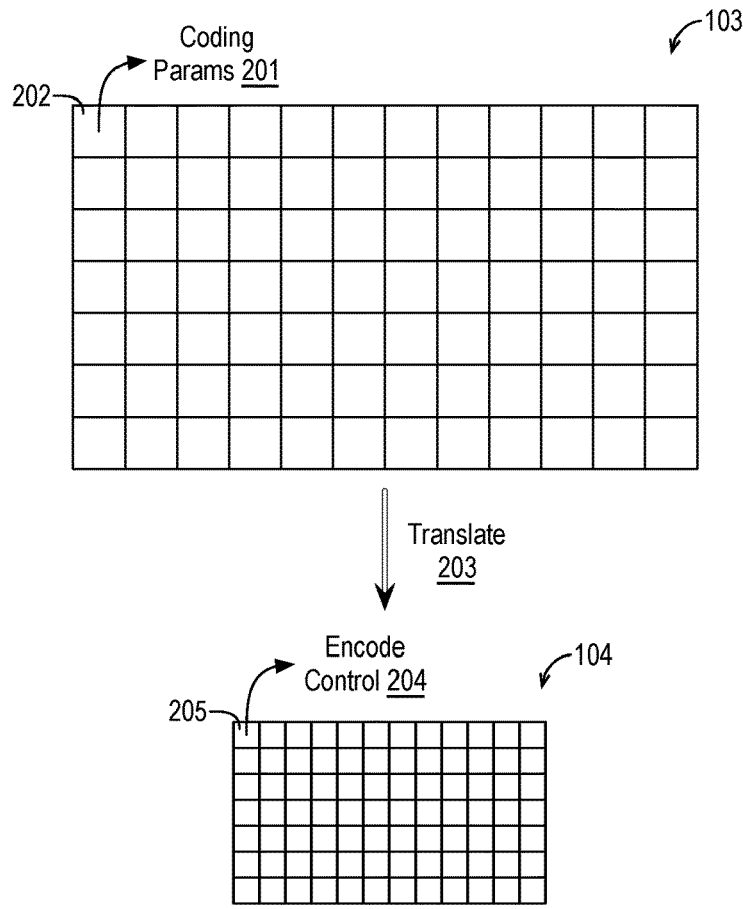
FIG. 2 is an illustrative diagram of example block level coding parameters and corresponding block level coding controls.

FIG. 2 is an illustrative diagram of example block level coding parameters 103 and corresponding block level coding controls 104, arranged in accordance with at least some implementations of the present disclosure. As shown in FIG. 2, block level coding parameters 103 include, for each block or coding unit or coding tree unit or the like such as exemplary block 202, one or more coding parameters 201. As discussed, coding parameters 201 may include CU size, TU size, coefficients, motion vectors, coding mode (i.e., inter, intra, single my, bidirectional, etc.), intra direction, and a best candidates list. Notably, coding parameters 201 for block 202 may include only those coding parameters relevant to the encode (at 4K) of block 202 such as the CU size of block 202, the CU partitioning of block 202 (e.g., partitioning of block 202 into CUs, if applicable), the TU depth or partitioning of block 202 (e.g., partitioning of block 202 or CUs thereof into TUs, if applicable), the final coding mode block 202 or CUs thereof (intra and, if so, direction or inter, and if so, motion vector and reference frame), and so on.

Returning to FIG. 1, as shown, block level coding parameters 103 are provided to translation module 112, which generates one or more block level coding controls 104, 105, 106 for differing resolutions, bitrates, frame rates, etc. In the illustrated embodiment, translation module 112 translates block level coding parameters 103 to 1080p block level coding controls 104, 720p block level coding controls 105, and 480p block level coding controls 106. However, any number of resolutions, bitrates (e.g., 20 Mbps, 15, Mbps, 10 Mbps, etc.), and frame rates (e.g., 60 fps, 30 fps, etc.) in any combination may be used. Notably, for changes in resolution, translation module 112 scales the 4K encode block level coding parameters 103 (e.g., 4K encode results) and translates them, at the block level (e.g., CU level), for use at the 1080p, 720p, 480p levels. In some embodiments, translation module 112 creates a surface (i.e., one of block level coding controls 104, 105, 106) at a per CU level in the new resolution with encode controls for the encoding enhancement of the lower resolution encode. Such enhancements optimize the performance and quality of the encode at lower resolutions. In addition to the performance optimizations, the visual quality can also be enhanced through more accurately capturing the true motion/characteristics of the video.

As shown, 1080p block level coding controls 104 and 1080p video 121 are provided to 1080p encode module 113, which encodes 1080p video 121 using block level coding controls 104 to generate bitstream 107. As discussed, 1080p video 121 is the same video content as 4K video 101 with lower resolution (and optionally lower frame rate). Although illustrated with respect to block level coding parameters 103 from a highest resolution encode being downscaled to block level coding controls 104, 105, 106 for lower resolution encode, in some embodiments, no resolution change is made and, in some embodiments, block level coding parameters 103 may be upscaled to generate any of block level coding controls 104, 105, 106. In an embodiment, a first encode is performed on 1080p video and the block level coding parameters are scaled both up to 4K block level coding controls and down to lower resolution coding controls for use in encode.

Block level coding controls 104, 105, 106 include restrictions for the encode of at least some of the blocks of video 121, 122, 123, respectively. As used herein, a restriction to encode decisions indicates the encode will be defined by the restriction (e.g., the restriction is used directly) or the encode will be modified by the restriction (e.g., the restriction is used to limit the number of encode options to be evaluated, searched, etc.). For example, block level coding controls 104, 105, 106 may include a restriction to check only inter modes and eliminate checks of intra modes for a block, a restriction to check only intra modes and eliminate checks of inter modes for a block, a restriction to check only a limited size of coding units for a block, a restriction to check only a limited size of transform units for a block, etc.

Notably, 1080p encode module 113 performs the encode of 1080p video 121 under the control of 1080p block level coding controls 104 to generate bitstream 107. The encode may be therefore adjusted using 1080p block level coding controls 104 such that some encode options are not evaluated (are bypassed) for the sake of performance enhancement. Such encode adjustments may include 1080p block level coding controls 104 defining some encode choices and 1080p block level coding controls 104 modifying the evaluation or search of other encode choices as is discussed further herein. Notably, 1080p encode module 113 does not simply apply coding decisions from the 4K encode but instead 1080p encode module 113 uses 1080p block level coding controls 104 to adjust decision making during the encode for optimal performance and video quality.

With reference to FIG. 2, as shown, block level coding parameters 103 at a first resolution are translated (via translation operation 203) to 1080p block level coding controls 104 at a second resolution less than the first resolution. Although illustrated with respect to 1080p block level coding controls 104, block level coding parameters 103 may be translated to block level coding controls 104, 105, 106 at any resolution. As illustrated with respect to encode controls 204 for block 205 (e.g., a block corresponding to block 202 such that it is collocated therewith), each block 205 of 1080p block level coding controls 104 may include one or more encode controls 204 for the encode thereof.

Such encode controls may include any suitable data structure or format to modify the encode of block 205. In some embodiments, encode controls 204 include a data structure to indicate only certain coding unit CU sizes of CUs of block 205 are to be evaluated (instead of evaluating any possible sizes of block 205). In some embodiments, encode controls 204 include a data structure to indicate a motion vector candidate for block 205 such that only a limited search range around the motion vector candidate is to be searched during encode. In some embodiments, encode controls 204 include a data structure to indicate only intra modes are to be evaluated for block 205 or CUs thereof. In some embodiments, encode controls 204 include a data structure to indicate only certain intra modes (e.g., down-right modes) are to be evaluated for block 205 or CUs thereof. In some embodiments, encode controls 204 include a data structure to indicate only inter modes for block 205 or CUs thereof. In some embodiments, encode controls 204 include a data structure to indicate only certain transform depths are to be evaluated for block 205 or CUs thereof. Other encode controls 204 are discussed herein. Furthermore, as used herein the term only with respect to evaluation or encode decisions indicates that other mode decisions, CU sizes, TU split depths, etc. are bypassed or skipped for the relevant block while other blocks may fully evaluate such encode parameters. That is, such language indicates an action by one of encode modules 113, 114, 115 to bypass, skip, etc. evaluation for a particular block such that performance enhancements by less than full evaluation is effectuated.

Returning to FIG. 1, bitstreams 107, 108, 109 as generated by encode modules 113, 114, 115 using block level coding controls 104, 105, 106 may be stored to memory, transmitted to another device, and so on for eventual decode and presentment of the decoded video to a user or users. Discussion now turns to generation of exemplary block based encode controls generation.

Figure 3A:
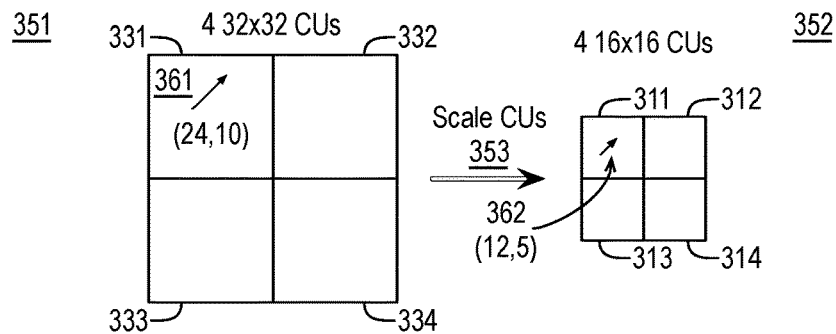
FIG. 3A is an illustrative diagram of an example direct scaling of blocks and motion vectors at a first resolution to blocks and motion vectors at a second resolution.

FIG. 3A is an illustrative diagram of an example direct scaling of blocks and motion vectors at a first resolution 351 to blocks and motion vectors at a second resolution 352, arranged in accordance with at least some implementations of the present disclosure. As shown in FIG. 3A, in some embodiments, scaling between resolutions is direct in that the scaling from blocks 331, 332, 333, 334 at resolution 351 generates blocks 311, 312, 313, 314 that have a size that is suitable for coding. For example, for scaling from 4K resolution to 1080p, blocks 331, 332, 333, 334 are scaled by a factor of 2 in both the x- and y-directions to generate blocks 311, 312, 313, 314. In the illustrated embodiment, blocks 331, 332, 333, 334 are each 32×32 CUs in resolution 351. The scaling operation 353 of blocks 331, 332, 333, 334 to blocks 311, 312, 313, 314 at resolution 352 then scales by 2 in each direction to generate four 16×16 CUs.

In such examples, motion vectors of any of blocks 331, 332, 333, 334, as illustrated with respect to motion vector 361 of block 331 can likewise be scaled for use at resolution 352. For example, motion vector 361 of (24,10) at 4K resolution for block 331 is scaled to a motion vector 362 of (12,5) at 1080p resolution for block 311. With reference to FIG. 1, in an embodiment, translation module 112, provides the downscaled motion vector as at least part of an encode control for block 311. In an embodiment, translation module 112 provides motion vector 362 and a restriction to check only a limited search range around the downscaled motion vector for block 311. In an embodiment, translation module 112 provides motion vector 362 and a restriction to check only inter modes (and not intra modes). Notably, blocks (or CUs) at resolution 351 that resolve to a larger block since there is no corresponding similar scaled block (CU) size at resolution 352 may retain intra check. For instance, a 4×4 block at the 4K level that is inter is too small to have a corresponding block size at 1080p, so intra is maintained for the 1080p block. In an embodiment, translation module 112 provides downscaled motion vector 362 and a restriction to check only fractional motion vectors around motion vector 362 for block 311. Notably, such encode controls drastically reduce the coding mode searching for block 311 by eliminating intra mode evaluation and large parts of motion estimation needed when motion vector 362 and the corresponding restrictions are applied. Benefits of such techniques are evidenced during encode when, for example, neighbor blocks are known to not check intra, adjacent blocks can be optimized to not store or return the corresponding reconstructed pixels thereby saving bandwidth and power.

Figure 3B:
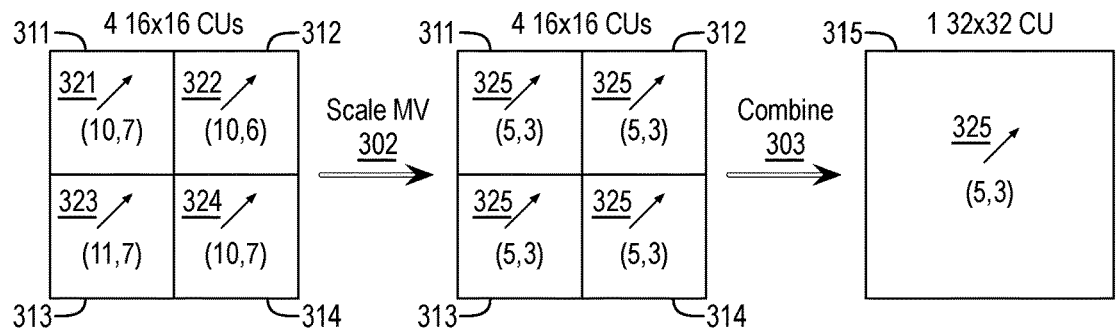
FIG. 3B is an illustrative diagram of an example merging of blocks for use of a single motion vector.

FIG. 3B is an illustrative diagram of an example merging of blocks for use of a single motion vector, arranged in accordance with at least some implementations of the present disclosure. As shown in FIG. 3B, in some embodiments, blocks 331, 332, 333, 334 may be scaled from resolution 351 to blocks 311, 312, 313, 314 at resolution 352 such that at least some of motion vectors 321, 322, 323, 324 for blocks 331, 332, 333, 334 (e.g., motion vectors are not yet scaled) are different. In the illustrated embodiment, motion vector 321 for block 331 is (10,7), motion vector 322 for block 332 is (10,6), motion vector 323 for block 333 is (11,7), and motion vector 324 for block 334 is (10,7).

As shown by scaling motion vectors operation 302, motion vectors 321, 322, 323, 324 for blocks 331, 332, 333, 334 are scaled to motion vectors 321, 322, 323, 324 for blocks 311, 312, 313, 314 such that the scaling provides for the same motion vector 325 for each of blocks 311, 312, 313, 314. That is, as resolution scales down, so too do the motion vectors scale down thereby losing resolution and, in some contexts, neighboring blocks resolve to the same motion vector 325. In such embodiments, blocks 311, 312, 313, 314 are merged via combine operation 303 to generate a merged block 315 that has a corresponding motion vector 325.

As discussed with respect to FIG. 3A, in such examples, motion vector 325 of merged block 325 (as well as the updated size of merged bock 325) may be provided by translation module 112 for use during encode of block 325. In various embodiments, translation module 112 provides motion vector 325 and a restriction to check only a limited search range or a restriction to check only fractional motion vectors. For example, the resolution scales down so too do the motion vectors and, in the context of HEVC, motion vectors are limited to one-eighth of a pixel resolution such that small (e.g., one-eighth pixel or other) motion differences between adjacent CUs may be combined to make a larger CU at the lower resolution. As discussed, in some embodiments, motion vector 325 may be provided for merged block 315. In other embodiments, only the new block size of or an inter only search command may be provided for merged block 315. In an embodiment, translating block level coding parameters 103 to block based encode controls 104, 105, 106 includes scaling motion vector 321 at resolution 351 for block 311 to scaled motion vector 325 at resolution 352 and motion vector 322 at resolution 351 for block 312 (such that block 312 neighbors block 311) to scaled motion vector 325 at second resolution 352 and merging blocks 311, 312 to merged block 325 at resolution 352 and assigning scaled motion vector 325 to merged block 325.

As discussed with respect to FIGS. 3A and 3B, motion search restrictions may be provided as part of block level coding controls 104, 105, 106. There are a number of optimizations to improve motion estimation (e.g., integer motion estimation) that may be implemented as a part of block level coding controls 104, 105, 106. In an embodiment, block level coding controls 104, 105, 106 include a restriction (e.g., providing a processing optimization) to check a much smaller region around a particular motion vector or motion vectors provided as part of block level coding controls 104, 105, 106. In an embodiment, block level coding controls 104, 105, 106 include a restriction (e.g., providing a processing optimization) to perform only fractional motion estimation (e.g., less than integer motion estimation) around a particular motion vector or motion vectors provided as part of block level coding controls 104, 105, 106.

In an embodiment, block level coding controls 104, 105, 106 include an indication to replace hierarchical motion estimation (HME) predictors with a particular motion vector or motion vectors provided as part of block level coding controls 104, 105, 106 (e.g., the motion estimation results from the 4K encode). Such motion vector predictors may be provided at the block level, a region level (greater than the block level), or at a frame level. In an embodiment, if the HME predictors are always at the 32×32 granularity and there are multiple predictors from the 4K encode, block level coding controls 104, 105, 106 may choose to send the predictor least homogenous with other blocks since those neighbor blocks would create a merge candidate at those locations which would become a search location automatically.

In some embodiments, block level coding controls 104, 105, 106 include a restriction to check only a particular reference frame provided as part of block level coding controls 104, 105, 106. In an embodiment, block level coding controls 104, 105, 106 include a reference frame identifier such that only that reference frame is searched. such a reference frame identifier may be at the block level, a region level (greater than the block level), or at a frame level.

Furthermore, during encode, since merge operations have a dependency on neighbor blocks, it is difficult to know in advance if a merge candidate will be in the merge list. In some embodiments, if a merge candidate for a particular block matches the scaled 4K result (e.g., the motion vector provided by block level coding controls 104, 105, 106), then other merge candidates are eliminated and that merge candidate is selected for merge operations. But, if there is no merge candidate that matches the 4K result (e.g., the motion vector provided by block level coding controls 104, 105, 106) or is very close to it (e.g., based on motion vector difference), then merge operations are performed as normal and only the motion vector search is performed. For example, encode modules 113, 114, 115 may modify merge operations using block level coding controls 104, 105, 106 as discussed such that if a merge candidate for a particular block matches the scaled 4K result (e.g., the motion vector provided by block level coding controls 104, 105, 106) then other merge candidates are eliminated and that merge candidate is selected for merge operations and if there is no merge candidate that matches the 4K result (e.g., the motion vector provided by block level coding controls 104, 105, 106) or is very close to it (e.g., based on motion vector difference), then merge operations are performed as normal and only the motion vector search is performed. In an embodiment, the determination as to whether a merge candidate matches the 4K result is based on determining a difference or delta between the motion vectors using any suitable technique or techniques such as differencing the motion vectors, generating a sum of squares of the differences between the motion vectors in the x- and y-dimensions, etc. and comparing the difference or delta to a predetermined threshold.

Returning to FIG. 3A, as discussed, motion vector 362 may be used for block 311 based on downscaling motion vector 361 and motion vector 362 may be used to limit inter mode searching during encode.

In other embodiments, when block 332 (for example) was coded using an intra mode, an encode control 204 for block 312 may be set to restrict mode evaluations for block 312 such that only intra modes (and no inter modes) are checked for block 312. With reference to FIG. 1, in an embodiment, translation module 112, provides the intra mode as at least part of an encode control for block 312. In an embodiment, translation module 112 provides the intra mode and a restriction to check only intra modes for block 312. In an embodiment, translation module 112 provides the intra mode and a restriction to check only intra modes adjacent to the intra mode for block 312. For example, if the intra mode is mode 18 only certain modes around mode 18 (e.g., 17, 18, and 19 or 16, 17, 18, 19, and 20, etc.) may be checked. In an embodiment, only the mode and a single neighbor are checked. In an embodiment, only the mode and two neighbors on each side are checked. In an embodiment, only the mode and three neighbors on each side are checked. However, any number of neighbors in the range of 1 to 6 may be used.

Figure 4:
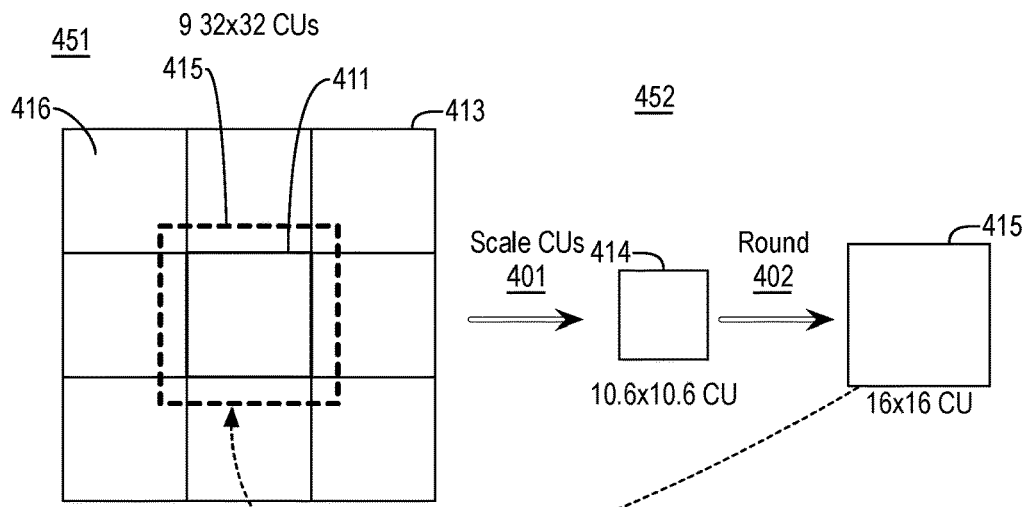
FIG. 4 is an illustrative diagram of an example overlap detection for determining an encode control for a particular block.

FIG. 4 is an illustrative diagram of an example overlap detection for determining an encode control for a particular block, arranged in accordance with at least some implementations of the present disclosure. As shown in FIG. 4, in some embodiments, scaling between resolutions is not directly scalable in that the scaling from blocks 413, including a subject block 411, at resolution 451 generates blocks, including resultant block 414, that have a size that is not suitable for coding at resolution 452 (which is less than resolution 451). For example, in scaling between resolutions, blocks 413 are scaled by a particular factor(s) in the x- and y-directions to generate blocks including block 414 that are fractional pixel blocks. In such examples, resultant block 414 may be rounded up to any suitable size block 415 and translated back to resolution 451 to detect neighbors 416 of subject block 411.

In an embodiment, when all or a majority of blocks 413 (e.g., subject block 411 and each of neighbors 416) have the same or similar mode, the mode of subject block 411 is provided for encode control as discussed herein. In an embodiment, when all of blocks 413 are intra (of any direction), the intra mode of subject block 411 and an intra only restriction is provided. In an embodiment, when all of blocks 413 are intra of the same direction, the intra mode of subject block 411 and an intra only restriction is provided. In an embodiment, the intra only restriction checks only intra modes neighboring the intra direction as discussed above. In an embodiment, translating block level coding parameters 103 to block based encode controls 105 includes determining, for block 414 at resolution 452, multiple overlapping blocks 416 at resolution 451, setting, when a mode decision for each of overlapping blocks 416 and block 411 is an intra mode, a restriction for block 414 (or a suitable sized CU corresponding thereto) to only check intra modes or setting, when the mode decisions for the overlapping blocks are a mix of intra and inter modes, no mode check restriction for block 414 (or a suitable sized CU corresponding thereto). In some embodiments, not all neighboring blocks 416 must match the mode of block 411 for the mode to be used as an encode restriction. In an embodiment, only a majority of neighboring blocks 416 must match the mode of block 411 for the mode to be used as an encode restriction. In an embodiment, the ratio of neighboring blocks 416 that match the mode of block 411 must exceed a threshold such as 0.625. For example, the threshold indicates where the blocks matching make up some majority of the areas. In an embodiment, if more than 0.625 of the relevant pixels for the block match the mode is used. In an embodiment, if fractional blocks are contributing less pixels to decide the decision than the block(s) that are entirely collocated in the block, the mode tends to be used.

Similarly, in some embodiments, when all of blocks 413 are intra (of any inter decision or motion vector), the motion vector of subject block 411 and an inter only restriction is provided. Restrictions of limited motion vector searching or fractional motion vector searching may also be applied. In an embodiment, when all of blocks 413 are inter and their motion vectors resolve to the same motion vector, the motion vector and an inter only restriction are provided. Notably, merge may also be performed in such examples as discussed herein with respect to FIG. 3B. In an embodiment, translating block level coding parameters 103 to block based encode controls 105 includes determining, for block 414 at resolution 452, multiple overlapping blocks 416 at resolution 451, setting, when a mode decision for each of overlapping blocks 416 and block 411 is an inter mode, a restriction for block 414 (or a suitable sized CU corresponding thereto) to only check inter modes or setting, when the mode decisions for the overlapping blocks are a mix of intra and inter modes, no mode check restriction for block 414 (or a suitable sized CU corresponding thereto).

In another embodiment, fractional blocks are ignored and only the mode (and corresponding encode controls) of block 411 is used as discussed herein. In some embodiments, when the blocks overlap fractionally, the blocks that make the majority of that region are used to define the mode (and corresponding encode controls). In some embodiments, when the blocks overlap fractionally, the mode (and corresponding encode controls) are applied only when all overlapping blocks have matching modes. In some embodiments, stricter encode controls are used when all overlapping blocks have matching modes and less strict controls are used when not all blocks have matching modes.

Figure 9:
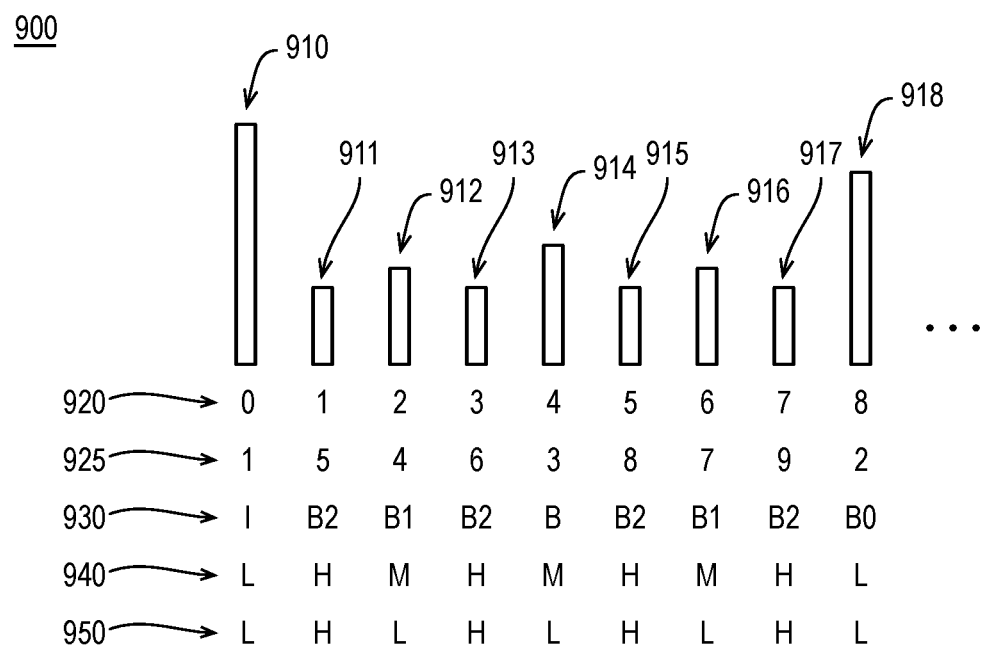
FIG. 9 illustrates exemplary generation of block based encode controls based on frame type for group of frames having a hierarchical B structure.

Such stricter and less strict controls are discussed further herein and, in particular, with respect to FIG. 9.

Figure 5:
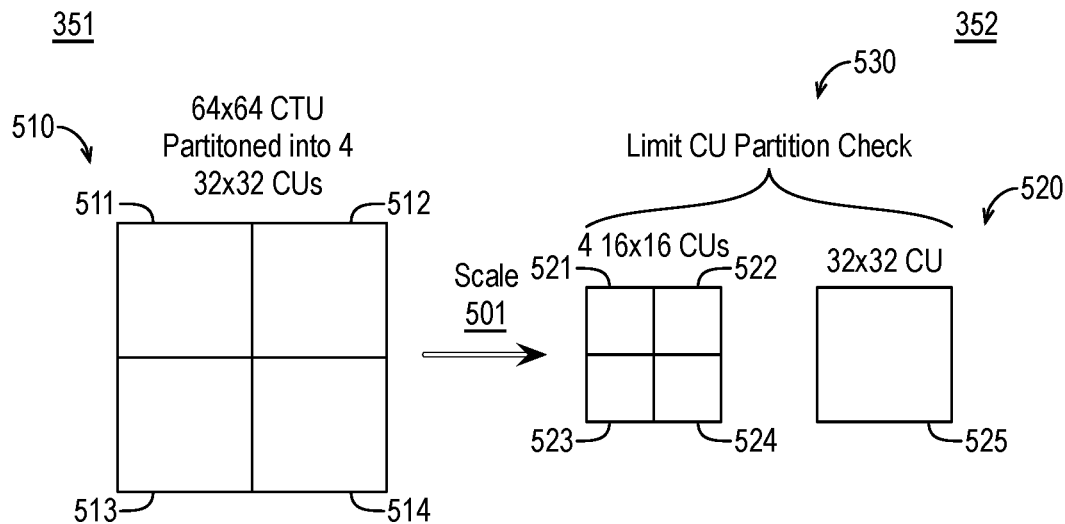
FIG. 5 is an illustrative diagram of an example encode control for block or coding unit size evaluation restriction.

FIG. 5 is an illustrative diagram of an example encode control for block or coding unit size evaluation restriction, arranged in accordance with at least some implementations of the present disclosure. As shown in FIG. 5, in some embodiments, during encode via encode module 111 of video 101, a block 510 may be partitioned into coding sub blocks 511, 512, 513, 514 such that each of sub blocks 511, 512, 513, 514 are coded according to a particular mode. For example, block 510 may be a coding tree unit (or largest coding unit) and block 510 may be coded using coding units or blocks 511, 512, 513, 514. As discussed, block 510 may be downscaled (via scaling operation 501) and coding modes of blocks 511, 512, 513, 514 may be translated for use during a subsequent encode.

In addition or in the alternative, an encode restriction for downscaled block 520 (as provided by scaling operation 510) may be provided such that only particular partitionings of block 520 are checked during encode. It is noted that translating a coding unit partitioning decision without checks of other partition sizes is too constraining in terms of video quality. Instead, the evaluation of partitions is restricted as shown with respect to limited CU partition check restriction 530. In an embodiment, a downscaled coding unit partition of block 520 in accordance with the partitioning of block 510 (i.e., including sub blocks 521, 522, 523, 524) is evaluated along with a one larger partitioning of block 520 as shown with respect to block 525. In this case, the larger block 520 is the same size as scaled down block 520. For example, a 64×64 CTU (or largest CU) partitioned into four 32×32 CUs by encode module 111 may be translated by translation module 112 to coding mode parameters for a corresponding block 520 at the lower resolution such that the encode controls indicate evaluation of four 16×16 CUs (the similarly scaled size) and one 32×32 CU (next larger size since some details is lost during the scaling operation) for block 520 are to be evaluated (while smaller partitions are not evaluated). As discussed, a CU size scaled from 4K changes based on the resolution change. For example, a 64×64 CU at 4K resolution becomes a 32×32 CU at 1080p resolution. If CU size choice is constrained to the projected size (32×32 in this example) and the next largest size, low visual quality impact occurs while drastic encode speed and efficiency performance is provided.

In some embodiments, translating block level coding parameters 103 to block level encode controls 104 includes determining block 510 at resolution 351 is partitioned into coding units or blocks 511, 512, 513, 514 of only a particular coding unit size (e.g., 32×32) that is greater than a smallest available coding unit size (e.g., 4×4 in the context of HEVC) and setting, in response to block 510 being partitioned into coding units or blocks 511, 512, 513, 514 of only the particular coding unit size, a limited coding unit partition size check for block 520 (e.g., corresponding to block 510) at resolution 352 to coding units or blocks 521, 522, 523, 524 of only a scaled size of the particular coding unit size at resolution 352 and a coding unit size greater than the scaled size at resolution 352. Notably, 16×16 blocks 521, 522, 523, 524 are of a scaled size with respect to 32×32 blocks 511, 512, 513, 514 according to the scaling from resolution 351 to resolution 352.

Figure 6:
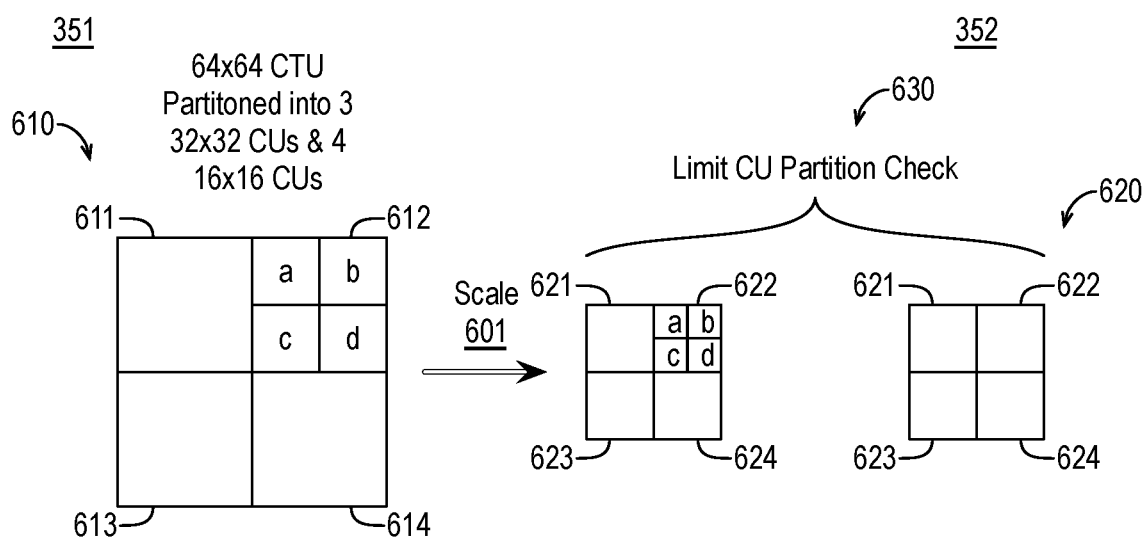
FIG. 6 is an illustrative diagram of another example encode control for block or coding unit size evaluation restriction.

FIG. 6 is an illustrative diagram of another example encode control for block or coding unit size evaluation restriction, arranged in accordance with at least some implementations of the present disclosure. As shown in FIG. 6, in some embodiments, during encode via encode module 111 of video 101, a block 610 may be partitioned into coding sub blocks 611, 613, 614, 612a, 612b, 612c, 612d such that each of sub blocks 611, 613, 614, 612a, 612b, 612c, 612d are coded according to a particular mode. For example, block 610 may be a coding tree unit (or largest coding unit) and block 610 may be coded using coding units or blocks 611, 613, 614, 612a, 612b, 612c, 612d. In contrast to block 510 of FIG. 6, which includes only 32×32 blocks, block 610 includes not only 32×32 blocks 611, 613, 614 but also 16×16 blocks 611, 613, 614, 612a, 612b, 612c, 612d.

Notably, in contrast to block 510, since at least one block 612 has been further divided for coding into blocks 612a, 612b, 612c, 612d, a coding unit check of full block 620 is also bypassed. That is, an encode restriction for downscaled block 620 (as provided by scaling operation 601) may be provided such that only particular partitionings of block 620 are checked during encode. The evaluation of partitions is restricted as shown with respect to limited CU partition check restriction 630. In an embodiment, a downscaled coding unit partition of block 620 in accordance with the partitioning of block 610 (i.e., including sub blocks 621, 623, 624, 622a, 622,b, 622c, 622d) is evaluated along with a one larger partitioning of block 622. In this case, evaluation of the full block 520 is bypassed and the block sizes of blocks 621, 623, 624 are defined (e.g., no other sizes need be checked). Only with respect to block 622 are different block sizes checked: those at a scaled size corresponding to blocks 612a, 612b, 612c, 612d (e.g., 16×16 to 8×8) and the full size of block 622 itself.

For example, a 64×64 CTU (or largest CU) partitioned into three 32×32 CUs and 4 neighboring 16×16 CUs by encode module 111 may be translated by translation module 112 to coding mode parameters for a corresponding block 620 at the lower resolution such that the encode controls indicate evaluation of a first partitioning into three 16×16 CUs and 4 8×8 CUs and a second partitioning into four 16×16 CUs for block 620. For example, the size N and size N+1 approach discussed above would indicate three 16×16 blocks and the larger 32×32 block as well as 8×8 blocks and a 16×16 for the smaller block would be evaluated. But, since there are finer details within that 32×32 block that will likely resolve to the smaller block size, the 32×32 block evaluation is eliminated for additional performance gains. Notably, a further enhancement is provided when a 32×32 CU of a 64×64 block projects to three 16×16 blocks and one group of four 8×8s blocks. In such contexts, if within one 32×32 block, there is one or more projected 8×8 block, the 32×32 mode is disabled, as discussed. In some embodiments, further refinements are provided by checking a sum of the motion vector differences to determine to check larger sizes or not. In an embodiment, a small difference or delta between the 16×16 motion vectors (even if there are four), might check the 32×32, but a large difference or delta would not. The determination of whether a large or small difference or delta exists may be performed as discussed above. Such techniques provide a variety of benefits during encode.

In addition to improving performance by checking fewer CU size candidates, there is a further performance benefit that block dependencies can be resolved faster. For example, blocks often need the full 64×64 block to be resolved before adjacent 64×64s can begin processing (the same holds for 32×32 blocks, 16×16 blocks, etc.) to maintain quality by getting the correct merge candidates and the reconstructed neighbor pixels. However, if a block size such as 64×64 or 32×32 is disabled, an adjacent block size can start knowing it has a winner. So, for instance, a neighbor 32×32 can start across 64×64 boundaries even though the prior 64×64 has not completed as it is known that the 64×64 is not a candidate. For example, the neighbor 64×64 has four 32×32 blocks within it (a 32×32 block A in the upper left corner, a 32×32 block B in the upper right corner, a 32×32 block C in the lower left corner, and a 32×32 block D in the lower right corner. The first 32×32 of the following 64×64 block must typically wait for all four 32×32 blocks in addition to the 64×64 candidate (since the winner of the 32×32 choices and the 64×64 choice is not known until all are evaluated). But, with the 64×64 eliminated as a choice, that 32×32 may only wait for the decision for 32×32 B to complete to start processing allowing an improvement in 50% more parallelization. That is, since the 64×64 block is not evaluated, processing may commence when the 32×32 block B in the upper right corner of the left 64×64 block is complete.

In some embodiments, translating block level coding parameters 103 to block level encode controls 104 includes determining block 610 at resolution 351 is partitioned into one or more coding units or blocks 611, 613, 614 of a particular coding unit size (e.g., 32×32) that is greater than a smallest available coding unit size (e.g., 4×4 in the context of HEVC) and one or more coding units or blocks 612a, 612b, 612c, 612d of a coding unit size smaller than the particular coding unit size (e.g., 16×16 CUs) and setting, in response to block 610 being partitioned into coding units or blocks of the particular coding unit size and coding unit size smaller than the particular coding unit size, a scaled size of the particular coding unit size to corresponding coding units or blocks 621, 622, 623 of block 620 (e.g., corresponding to block 610) at resolution 352. Notably, 16×16 blocks 621, 623, 624 are of a scaled size with respect to 32×32 blocks 611, 613, 614 according to the scaling from resolution 351 to resolution 352.

Figure 7:
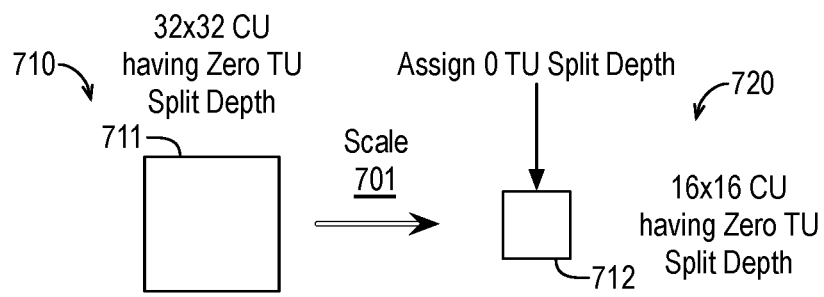
FIG. 7 is an illustrative diagram of an example encode control for block or transform unit size or split depth evaluation restriction.

FIG. 7 is an illustrative diagram of an example encode control for block or transform unit size or split depth evaluation restriction, arranged in accordance with at least some implementations of the present disclosure. As shown in FIG. 7, in some embodiments, during encode via encode module 111 of video 101, a coding unit or block 710 may not be partitioned for transform. That is, a split depth of zero (no split) transform unit (TU) split depth is assigned to block 710 such that all residual pixel samples 711 thereof are transformed to the frequency domain without split. For example, during encode, 16×16 transform coefficients in the frequency domain are generated from residual pixel samples 711 (or actual pixel samples). Notably, for coding unit or block 710 a split depth, based on evaluation of various splits of block 710 is selected such that, for example, a split depth of zero indicates no split (i.e., a 32×32 transform is applied), a split depth of one indicates a split to four 16×16 blocks (i.e., four 16×16 transforms are applied), a split depth of two indicates a split to 16 8×8 blocks (i.e., 16 8×8 transforms are applied), and a split depth of three indicates a split to 64 4×4 blocks (i.e., 64 4×4 transforms are applied).

As discussed, block 710 may be downscaled and coding modes including transform unit split depth guidance may be translated for use during a subsequent encode (as encode controls or restriction). In an embodiment, an encode restriction for downscaled block 720 (as provided by scaling operation 701) may be provided such that a transform unit split depth is assigned to coding unit or block 720 for the transform of pixel samples 712 (e.g., residual values or actual pixel values) such that transform split depth evaluation for block 720 is skipped at encode. Notably, by assigning a split depth of zero, no other split depths need to be evaluated thereby saving computational time and cost.

For example, similar to the CU size constraints discussed above, HEVC and new codecs provide more options in terms of the TU depth with respect to previous codec. As discussed, the TU depth may be adapted to other encodes based on the selected TU depth from the 4K encode. In some embodiments, more detailed areas that have TU splits in the 4K encode are checked in the other encodes (e.g., 1080p encode, 720p encode, 480p encode) while flatter regions are either not checked (as discussed above) or are not checked at as many depths (as discussed with respect to FIG. 8). In some embodiments, the min and max TU depth check at the second encode is adjusted based on heuristics from the 4K encode. Such techniques may be further influenced by the coefficients which get encoded in the 4K bitstream. In an embodiment, when the sum of squares of residuals for block 710 is less than a threshold and the transform depth is zero, only a transform depth of zero is checked for block 720 and, when the sum of squares of residuals for block 710 is greater than the threshold and the transform depth is zero, a transform depth of zero and one are checked for block 720 (while other depths are skipped).

In an embodiment, translating block level coding parameters 103 to block level encode controls 104, 105, 106 includes determining block 710 at resolution 351 has a zero transform unit split depth and setting, in response to block 710 having the zero transform unit split depth, a zero transform unit split depth for block 720 (which corresponding to block 710) at resolution 352 such that block 720 does not check split depths other than zero. In another embodiment, translating block level coding parameters 103 to block level encode controls 104, 105, 106 includes determining block 710 at resolution 351 has a zero transform unit split depth and setting, in response to block 710 having the zero transform unit split depth, a zero transform unit split depth for block 720 when the sum of squares of residuals 711 (or another residuals magnitude measure) does not exceed a threshold and a zero and one transform unit split depth evaluation control for block 720 when the residuals magnitude measure exceeds the threshold.

Figure 8:
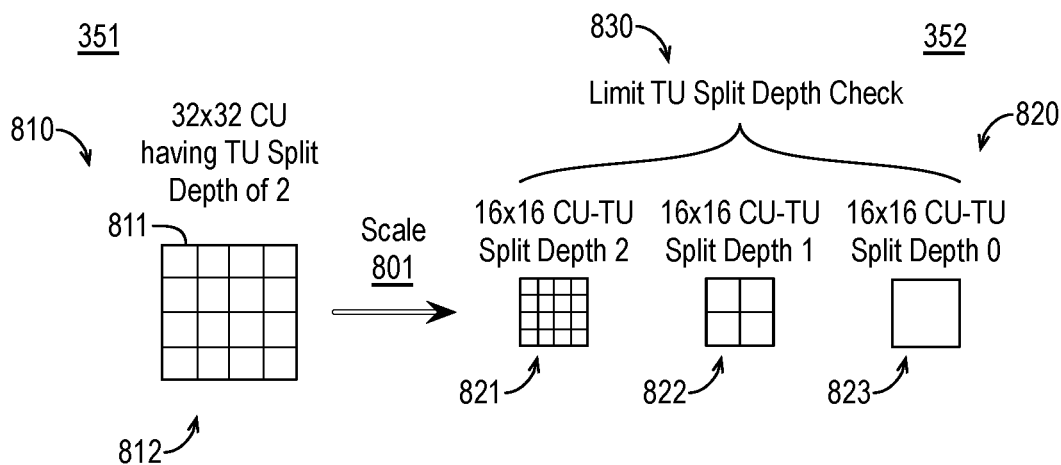
FIG. 8 is an illustrative diagram of an example encode control for block or transform unit size or split depth evaluation restriction.

FIG. 8 is an illustrative diagram of an example encode control for block or transform unit size or split depth evaluation restriction, arranged in accordance with at least some implementations of the present disclosure. As shown in FIG. 8, in some embodiments, during encode via encode module 111 of video 101, a coding unit or block 810 may not be partitioned for transform. In the illustrated embodiment, block 810 has a split depth of two such that block 810 is partitioned into 16 TUs 812 for transform of pixel samples 811.

As discussed, block 810 may be downscaled and coding modes including transform unit split depth guidance may be translated for use during a subsequent encode (as encode controls or restriction). In an embodiment, an encode restriction for downscaled block 820 (as provided by scaling operation 801) may be provided such that a transform unit split depth restriction 830 is assigned to coding unit or block 820 for the transform of the pixel samples thereof such that transform unit split depth restriction 830 indicates evaluation of the same TU split depth as block 810 and any other available bit depths that are less that the TU split depth as block 810. In this example, TU split depths of 2, 1, and 0 are evaluated for block 820 as shown with respect to partitioned blocks 821, 822, 823. In another embodiment, an encode restriction for downscaled block 820 is provided that indicates evaluation of the one less than the TU split depth as block 810 and any other available bit depths that are less that one less than the TU split depth as block 810. For example, block 820 may evaluated split depths of N−1 . . . 0 where N is the split depth level of block 810. In this example, TU split depths of 1 and 0 are evaluated for block 820 in response to the split depth of 2 of block 810. Such techniques may advantageously further reduce split depth evaluations by scaling the split depths along with scaling operation 801.

Furthermore the thresholding techniques discussed with respect to FIG. 7 may be extended to the example of FIG. 8. In an embodiment, when a residuals magnitude measure for block 810 is less than a threshold, transform depths of N−1 . . . 0 (where N is the split depth level of block 810) are checked for block 820 and, when the residuals magnitude measure for block 810 is greater than the threshold, transform depths of N . . . 0 (where N is the split depth level of block 810) are checked for block 820. Therefore, when the residuals are greater, additional split depths are evaluated.

In an embodiment, translating block level coding parameters 103 to block level encode controls 104, 105, 106 includes determining block 810 at resolution 351 has a non-zero transform unit split depth and setting, in response to block 810 having the non-zero transform unit split depth, limited transform unit split depth check 830 for block 820 (corresponding to block 810) at resolution 352 to check only the non-zero transform unit split depth and any other available split depths less than the non-zero transform unit split depth. In an embodiment, translating block level coding parameters 103 to block level encode controls 104, 105, 106 includes determining block 810 at resolution 351 has a non-zero transform unit split depth and setting, in response to block 810 having the non-zero transform unit split depth, limited transform unit split depth check 830 for block 820 (corresponding to block 810) at resolution 352 to check only one less than the non-zero transform unit split depth and any other available split depths less than the one less than the non-zero transform unit split depth. In an embodiment, translating block level coding parameters 103 to block level encode controls 104, 105, 106 includes determining block 810 at resolution 351 has a non-zero transform unit split depth and setting, in response to block 710 having the non-zero transform unit split depth, split depth check for block 820 to check only one less than the non-zero transform unit split depth and any other available split depths less than the one less than the non-zero transform unit split depth when residuals magnitude measure of residuals 811 does not exceed a threshold and to check only the non-zero transform unit split depth and any other available split depths less than the non-zero transform unit split depth when the residuals magnitude measure exceeds the threshold.

In addition or alternative to the discussed techniques, other optimizations that have different quality/performance tradeoffs can be implemented. In some embodiments, dynamically applying such optimizations can optimize the overall encoding experience. For example, when performance is constrained and there is a need to finish a frame within a certain time window, the optimizations can be employed to optimize the performance for that end. In an embodiment, in response to a frame being projected to finish processing after a certain time window, a higher level of encode controls is applied to the frame (such higher level encode controls are discussed further with respect to FIG. 9).

In addition, given the performance of the 4K encode and the heuristics options used in subsequent encodes, an accurate performance model may be created to guarantee encode performance (e.g., time) matches an encode requirement. In an embodiment, an encode model is generated for a subsequent encode and a higher level of encode controls are applied to particular frames (e.g., non-reference frames) when model indicates the performance time will not be met. In addition, in some embodiments, the new model (with the higher level of encode controls applied to non-reference frames may be evaluated and the higher level of encode controls may be iteratively applied to other frames (e.g., reference B-frames, then base B-frames, and lastly I-frames) until the performance time is met.

Furthermore, the dependencies between blocks and the longest path can be created to give further optimization to make sure blocks are prioritized along the critical path. In an embodiment, a block dependency path is generated and encode controls are provided to break such dependencies along the critical path. Another optimization can adjust the optimizations according to the frame hierarchy such as, for hierarchical B frame structures. In an embodiment, non-reference B frames can use more optimizations for performance benefits with minimal quality impact while less performance optimizations are used for the more heavily referenced frames. Such techniques are discussed herein with respect to FIG. 9. Although illustrated with respect to hierarchal B frame structure for the sake of clarity, the discussed techniques may be applied to any frame structure with reference and non-reference frames.

FIG. 9 illustrates exemplary generation of block based encode controls based on frame type for group of frames 900 having a hierarchical B structure, arranged in accordance with at least some implementations of the present disclosure. As shown in FIG. 9, group of frames 900 includes frames 910-918 (e.g., group of pictures). In the illustrated example, group of frames 900 is a group of 8 frames (not counting I-frame 910) in a display order 920 indicating that display order 920 (e.g., 0-8) follows the same order as frames 910-918 and frames 900 have an encode order 925. Furthermore, each frame has a frame type 930 such that frame 910 is an I-frame, frame 911 is a B2-frame, frame 912 is a B1-frame, frame 913 is a B2-frame, frame 914 is a B-frame, frame 915 is a B2-frame, frame 916 is a B1-frame, frame 917 is a B2-frame, and frame 918 is a B0-frame according to an example hierarchical B-frame structure. Although illustrated with particular details for the sake of clarity of presentation, group of frames 900 may include any number of frames of any suitable frame types in a suitable order.

In some embodiments, translation module 112 determines a frame type of a current frame being processed and, when the current frame is a non-reference B-frame (e.g., a B-frame not being used to code any other frames of a group of frames using motion compensation), translation module 112 applies a highest level of encode control restrictions as indicated by frame level encode control decisions 940 and 950 (where H indicates a highest level of encode control restrictions, L indicates a lowest level of encode control restrictions, and M indicates a level therebetween). In some embodiments, translation module 112 determines a frame type of a current frame being processed and, when the current frame is a non-reference B-frame (e.g., a B-frame not being used to code any other frames of a group of frames using motion compensation, labeled B2), translation module 112 applies a highest level of encode control restrictions and otherwise (e.g., for reference frames: I, B0 and B1) applies a lowest level of encode control restrictions as shown with respect to frame level encode control decisions 940. In some embodiments, translation module 112 determines a frame type of a current frame being processed and, when the current frame is a non-reference B-frame (B2), translation module 112 applies a highest level of encode control restrictions, when the current frame is an I-frame or a base layer B frame (B0), translation module 112 applies a lowest level of encode control restrictions, and when the current frame is a mid-level reference B-frame (B1), translation module 112 applies a medium level of encode control restrictions.

As used herein, high, low and medium encode control restrictions levels indicates an amount of encode restriction as provided via block level coding controls 104, 105, 106. For example, in reference to an intra mode, a high level may restrict intra search to only the intra direction being transferred and two neighbors, a medium level may restrict intra search to only the intra direction being transferred and six neighbors on both sides, and a high level may restrict to all intra modes (with inter search being excluded in all cases). Similarly, high CU size restrictions may search only the CU size transferred and one other (larger) CU size while medium and low CU size restrictions may search only the CU size transferred and two other CU size. Furthermore, high TU split depth restrictions may search only the TU split depth transferred and one other (lower level) split depth while medium and low TU split depth restrictions may search only the TU split depth transferred and any available lower level split depth. Notably, high level restrictions are more aggressive than medium and low level restrictions in terms of what is left out of the evaluation or search performed at encoder modules 113, 114, 115.

As shown in FIG. 9, in some embodiments, the implementation of such techniques provides frame level encode control decisions 940 and, in other embodiments, frame level encode control decisions 950. For example, in frame level encode control decisions 940, the frame level encode control level is set to low for frame 910 in response to it being an I-frame, to high for frame 911 in response to it being B2-frame, to medium for frame 912 in response to it being B1-frame, to high for frame 913 in response to it being B2-frame, to medium for frame 914 in response to it being B1-frame, to high for frame 915 in response to it being B2-frame, to medium for frame 916 in response to it being B1-frame, to high for frame 917 in response to it being B2-frame, and to low for frame 918 in response to it being a B0-frame. In frame level encode control decisions 950, the frame level encode control level is set to low for frame 910 in response to it being an I-frame, to high for frame 911 in response to it being B2-frame, to low for frame 912 in response to it being B1-frame, to high for frame 913 in response to it being B2-frame, to high for frame 914 in response to it being B1-frame, to high for frame 915 in response to it being B2-frame, to low for frame 916 in response to it being B1-frame, to high for frame 917 in response to it being B2-frame, and to low for frame 918 in response to it being a B0-frame.

In some embodiments, translating block level coding parameters 103 to block level encode controls 104, 105, 106 includes determining a first frame of video is a reference frame and a second frame of the video is a non-reference frame and applying more restrictions in the block based encode controls for the second frame relative to the first frame in response to the second frame being a non-reference frame. As discussed, as used herein the term reference frame indicates a frame that at least one other frame references for motion estimation and compensation while a non-reference frame indicates a frame that no other frame can reference for motion estimation and compensation.

The discussed techniques may assume the quantization parameter (QP) is the same or similar as implemented between 4K encode module 111 and, for example, 1080p encode module 112. However, as discussed, some encodes may use different bitrates for the same resolution (e.g., 4 k at 20 Mbps and 4 k at 15 Mbps). In some embodiments, the discussed optimizations may be used without using the motion vector scaling in the same manner. For example, motion vector distance may be used for lower bitrates (e.g., higher QP) to determine when to check larger block sizes. Furthermore, some of the discussed techniques may be altered, such as size constraints to only check the 4K projected size and the smaller sizes when the QP is lower that at initial encode. In an embodiment, in response to a QP at a second encode being less than a QP at a first encode, only CU or block size of the projected size (as discussed with respect to FIGS. 3A and 3B, for example) and smaller sizes are checked while larger sizes are not checked at the second encode.

Figure 10:
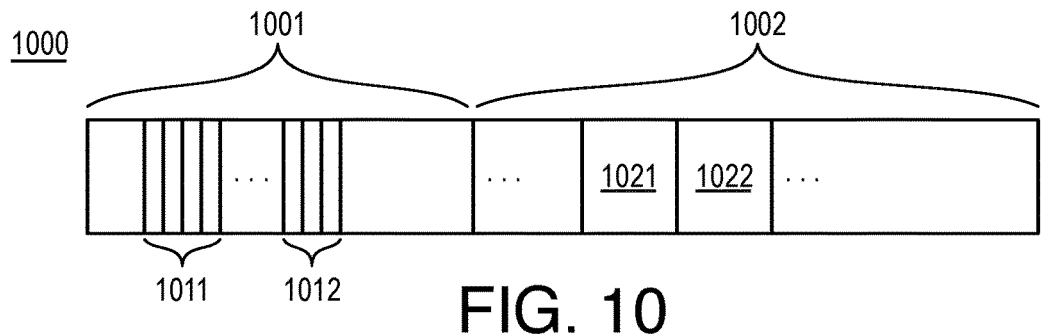
FIG. 10 illustrates an example bitstream.

FIG. 10 illustrates an example bitstream 1000, arranged in accordance with at least some implementations of the present disclosure. Bitstream 1000 may correspond to any of bitstreams 102, 107, 108, 109 and, as discussed, bitstream 1000 is independent in that no reference to or data from another bitstream is needed to generate decoded video therefrom. As shown in FIG. 10, in some embodiments, bitstream 1000 includes a header portion 1001 and a data portion 1002. Header portion 1001 may include mode decision indicators 1011, 1012 such as block or coding unit level mode decision indicators. For example, mode decision indicators 1011, 1012 may include mode decisions and partitionings of blocks of video. Furthermore, data portion 1002 may include block data 1021, 1022, which may include motion vectors, residual pixel values, etc. In some embodiments, bitstream 1000 is a standard compliant bitstream. Notably, bitstream 1000 may be transmitted, stored, etc. for eventual decoding by a decoder.

Figure 11:
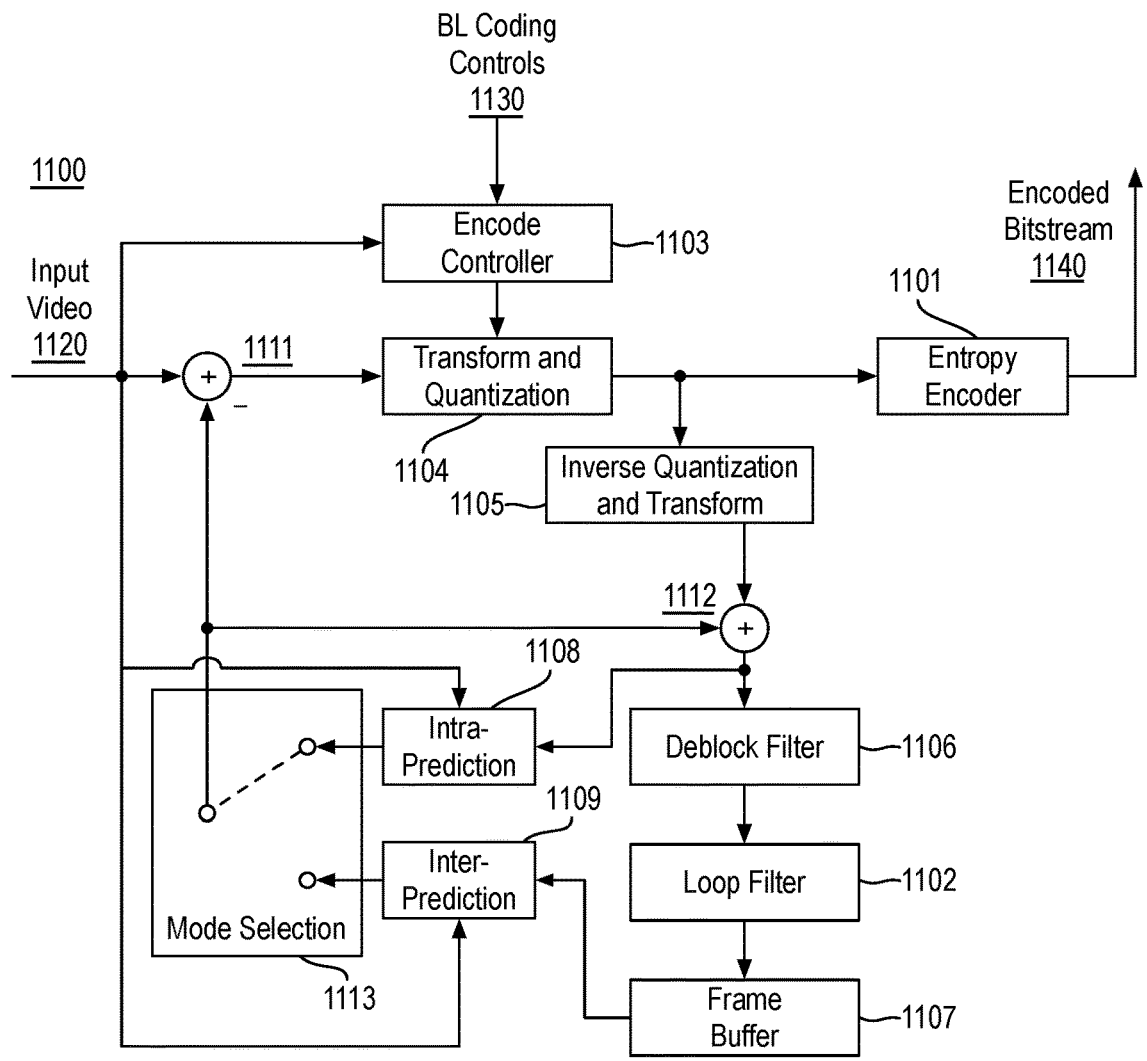
FIG. 11 illustrates a block diagram of an example encoder for performing clustered video coding.

FIG. 11 illustrates a block diagram of an example encoder 1100 for performing clustered video coding, arranged in accordance with at least some implementations of the present disclosure. As shown, encoder 1100 includes an entropy encoder 1101, a loop filter 1102, an encode controller 1103, a transform and quantization module 1104, an inverse quantization and transform module 1105, a deblock filter 1106, a frame buffer 1107, an intra-prediction module 1108, and an inter-prediction module 1109. Encoder 1100 may include additional modules and/or interconnections that are not shown for the sake of clarity of presentation. Notably, encoder 1100 may implement any of encode modules 111, 112, 113, 114. In an embodiment, encoder 1100 implements one of encode modules 112, 113, 114 such that the illustrated input video 1120 is one of video 12, 122, 123, block level coding controls 1130 are one of one block level encode controls 104, 105, 106, and bitstream 1140 is one of bitstreams 107, 108, 109.

As shown in FIG. 11, encoder 1100 receives input video 1120. Input video 1120 may be in any suitable format and may be received via any suitable technique such as downsampling of video 101, fetching from memory, transmission from another device, etc. As discussed, encode of input video 1120 is controlled, in part by block level coding controls 1130 such that various encode decisions for input video 1120 are made or influenced by block level coding controls 1130. For example, block or CU sizes, transform unit split depths, motion vectors, motion search constraints, intra modes, intra search constraints and so on are implemented via encode controller 1103 using block level coding controls 1130. Based at least in part on block level coding controls 1130, frames of input video 1120 may be processed to determine coding portions of thereof (e.g., blocks, coding tree units, coding units, partitions etc.). As shown, input video 1120 may be provided to encode controller 1103, intra-prediction module 1108, and inter-prediction module 1109. The coupling to intra-prediction module 1108 or inter-prediction module 1109 may be made via mode selection module 1113 as shown. For example, mode selection module 1113 may make final mode decisions for portions of video frames of input video 1120, again, based on limited evaluation, searching, etc. as indicated by block level coding controls 1130.

As shown, mode selection module 1113 (e.g., via a switch), may select, for a coding unit or block or the like between an intra-prediction mode and an inter-prediction mode based on block level coding controls 1130 as well as minimum coding cost as determined based on the limited search. Based on the mode selection, a predicted portion of the video frame is differenced via differencer 1111 with the original portion of the video frame (e.g., of block level coding controls 1130) to generate a residual. The residual may be transferred to transform and quantization module 1104, which may transform (e.g., via a discrete cosine transform or the like) the residual to determine transform coefficients and quantize the transform coefficients using the frame level QP discussed herein. Such transform operations may be determined under control of block level coding controls 1130 and any partial split depth evaluation. The quantized transform coefficients may be encoded via entropy encoder 1101 into encoded bitstream 1140. Other data, such as motion vector residuals, modes data, transform size data, or the like may also be encoded and inserted into encoded bitstream 1140.

Furthermore, the quantized transform coefficients are inverse quantized and inverse transformed via inverse quantization and transform module 1105 to generate a reconstructed residual. The reconstructed residual may be combined with the aforementioned predicted portion at adder 1112 to form a reconstructed portion, which may be deblocked via deblock filter 1106 and in-loop filtered using loop filter 1102 to generate a reconstructed frame. The reconstructed frame is then saved to frame buffer 1107 and used for encoding other portions of the current or other video frames. Such processing may be repeated any additional frames of input video 1120.

Figure 12:
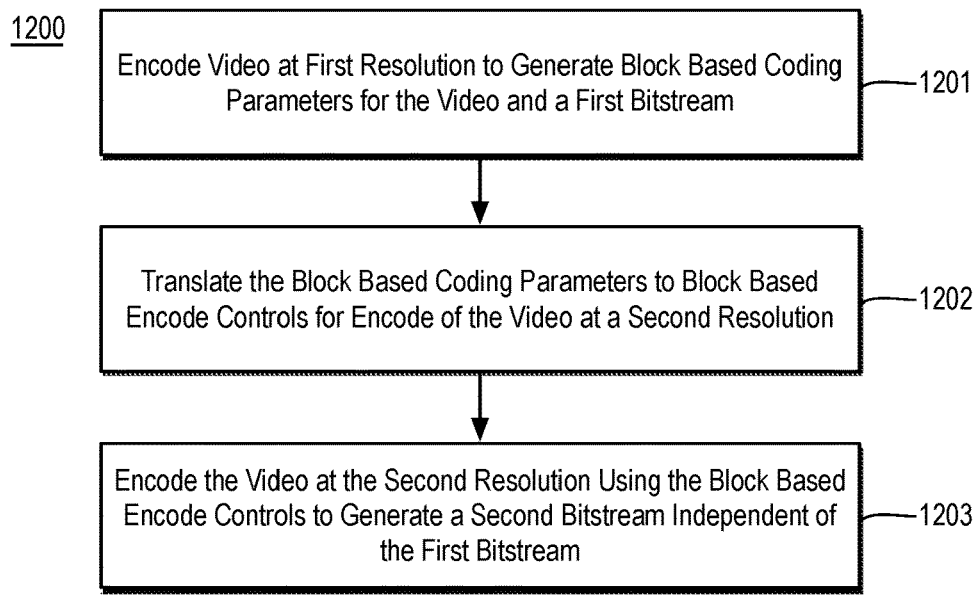
FIG. 12 is a flow diagram illustrating an example process for video coding.

FIG. 12 is a flow diagram illustrating an example process 1200 for video coding, arranged in accordance with at least some implementations of the present disclosure. Process 1200 may include one or more operations 1201-1203 as illustrated in FIG. 12. Process 1200 may form at least part of a video coding process. By way of non-limiting example, process 1200 may form at least part of a video coding process as performed by any device or system as discussed herein such as system 100 and/or encoder 1100. Furthermore, process 1200 will be described herein with reference to system 1300 of FIG. 13.

Figure 13:
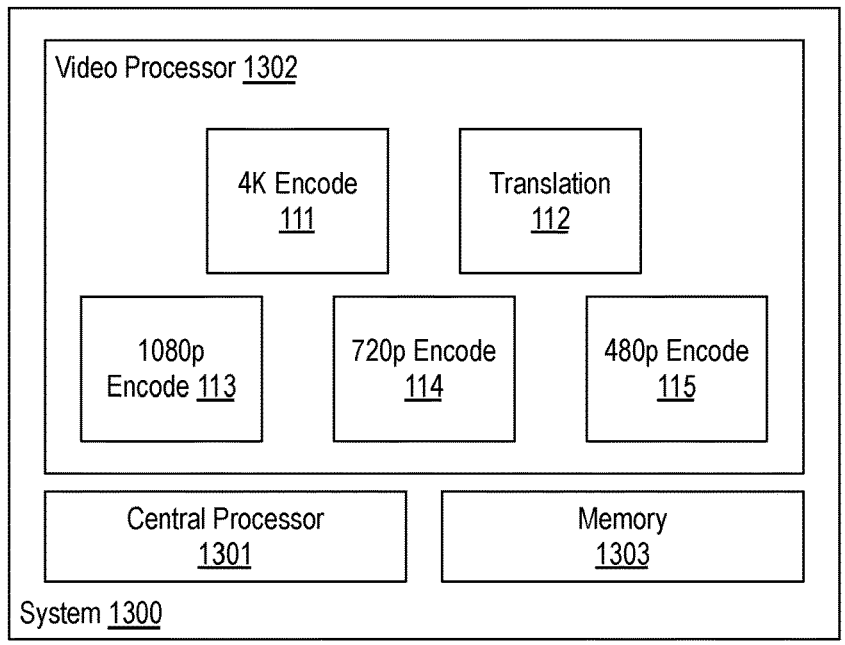
FIG. 13 is an illustrative diagram of an example system for video coding.

FIG. 13 is an illustrative diagram of an example system 1300 for video coding, arranged in accordance with at least some implementations of the present disclosure. As shown in FIG. 13, system 1300 may include a central processor 1301, a video processor 1302, and a memory 1303. Also as shown, video processor 1302 may include or implement encode modules 111, 113, 114, 115 and translation module 112. In an embodiment, memory 1303 implements frame buffer 1107. Furthermore, in the example of system 1300, memory 1303 may store video data or related content such as frame data, coding unit data, motion vector data, intra mode decision data, coding unit partitioning data, transform unit split depth data, bitstream data, block level coding parameters, block level coding controls, and/or any other data as discussed herein.

As shown, in some embodiments, simultaneous encode modules 111, 113, 114, 115 and translation module 112 are implemented via video processor 1302. In other embodiments, one or more or portions of encode modules 111, 113, 114, 115 and translation module 112 are implemented via central processor 1301 or another processing unit such as an image processor, a graphics processor, or the like.

Video processor 1302 may include any number and type of video, image, or graphics processing units that may provide the operations as discussed herein. Such operations may be implemented via software or hardware or a combination thereof. For example, video processor 1302 may include circuitry dedicated to manipulate frames, frame data, or the like obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory.

In an embodiment, one or more or portions of encode modules 111, 113, 114, 115 and translation module 112 are implemented via an execution unit (EU). The EU may include, for example, programmable logic or circuitry such as a logic core or cores that may provide a wide array of programmable logic functions. In an embodiment, one or more or portions of encode modules 111, 113, 114, 115 and translation module 112 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 12, process 1200 begins at operation 1201, where a video is encoded at a first resolution and a first bitrate to generate block based coding parameters for the video and a first bitstream such that the block based coding parameters are at a block level at the first resolution. The first bitrate and resolution may be any suitable values. In an embodiment, the resolution is 4K resolution and the bitrate is 20 Mbps. The block based coding parameters may be any block based coding parameters discussed herein such as, for each coding unit block, one or more of a coding unit (CU) size, CU partitions sizes of the block, a transform unit (TU) size, coefficients (i.e., transformed and quantized residuals), motion vectors (mv), coding mode (i.e., inter, intra, single mv, bidirectional, etc.), intra direction, and a best candidates list.

Processing continues at operation 1202, where the block based coding parameters are translated to block based encode controls for encode of the video at a second resolution or a second bitrate such that the block based encode controls include restrictions to encode decisions at a block level at the first or second resolution. The second resolution may be any resolution such as 1080p, 720p, 480p and the second bitrate may be any bitrate such as 15, 10, or 5 Mbps. The block based encode controls may be any controls discussed herein such as restrictions to check only inter modes and eliminate checks of intra modes for one or more blocks, restrictions to check only intra modes and eliminate checks of inter modes for one or more blocks, restriction to check only a limited size of coding units for one or more blocks, a restriction to check only a limited size of transform units for one or more blocks, or any other restrictions or controls discussed herein.

In an embodiment, translating the block based coding parameters to block based encode controls includes scaling a first motion vector for a first block at the first resolution to a first scaled motion vector at the second resolution and a second motion vector for a second block at the first resolution neighboring the first block to a second scaled motion vector at the second resolution such that the first and second motion vectors are different and the first and second scaled motion vectors are the same and merging the first and second blocks to a merged block at the second resolution and assigning the first scaled motion vector to the merged block.

In an embodiment, the first resolution is greater than the second resolution, the first resolution is not directly scalable to the second resolution, and translating the block based coding parameters to block based encode controls includes determining, for a first block at the second resolution, multiple overlapping blocks at the first resolution and setting, when a mode decision for each of the overlapping blocks is an intra mode, a restriction for the first block to only check intra modes or setting, when the mode decisions for the overlapping blocks are a mix of intra and inter modes, no mode check restriction for the first block.

In some embodiments, translating the block based coding parameters to block based encode controls includes determining a first block at the first resolution is partitioned into coding units of only a first coding unit size greater than a smallest available coding unit size and setting, in response to the first block being partitioned into coding units of only the first coding unit size, a limited coding unit partition size check for a second block corresponding to the first block at the second resolution to coding units of only a scaled size of the first coding unit size at the second resolution and a second size greater than the scaled size at the second resolution. In some embodiments, translating the block based coding parameters to block based encode controls further includes determining a second block at the first resolution is partitioned into one or more second coding units of the first coding unit size and one or more third coding units of a second coding unit size smaller than the first coding unit size and setting, in response to the second block being partitioned into the first and second coding units of the first and second unit sizes, respectively, the scaled size of the first coding unit size to corresponding third coding units of a third block corresponding to the first block at the second resolution.

In an embodiment, translating the block based coding parameters to block based encode controls includes determining a first block at the first resolution has a zero transform unit split depth and setting, in response to the first block having the zero transform unit split depth, a zero transform unit split depth for a third block corresponding to the first block at the second resolution. In an embodiment, translating the block based coding parameters to block based encode controls includes determining a first block at the first resolution has a non-zero transform unit split depth and setting, in response to the first block having the non-zero transform unit split depth, a limited transform unit split depth check for a second block corresponding to the first block at the second resolution to check only split depths of one less than the non-zero transform unit split depth and any other available split depths less than the one less than the non-zero transform unit split depth.

In some embodiments, translating the block based coding parameters to block based encode controls includes determining a first motion vector for a first block at the first resolution and setting, in response to the first motion vector, a limited search region or a fractional search region around the first motion vector for a second block corresponding to the first block at the second resolution.

In an embodiment, translating the block based coding parameters to block based encode controls includes determining a first frame of the video is a reference frame and a second frame of the video is a non-reference frame and applying more restrictions in the block based encode controls for the second frame relative to the first frame in response to the second frame being a non-reference frame.

Processing continues at operation 1203, where the video is encoded at the second resolution or the second bitrate using the block based encode controls to generate a second bitstream, wherein the second bitstream is independent of the first bitstream. As discussed the first and second bitstreams are independent in that the first and second bitstreams do not rely in any way on each other for decode of the video.

Process 1200 may be repeated any number of times either in series or in parallel for any number of videos, pieces of video content. video segments, or the like. As discussed, process 1200 may provide for video cluster encoding one piece of video content to generate multiple independent bitstreams that represent encodes of differing characteristics such as frame resolutions, bitrates, frame rates, and combinations thereof.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
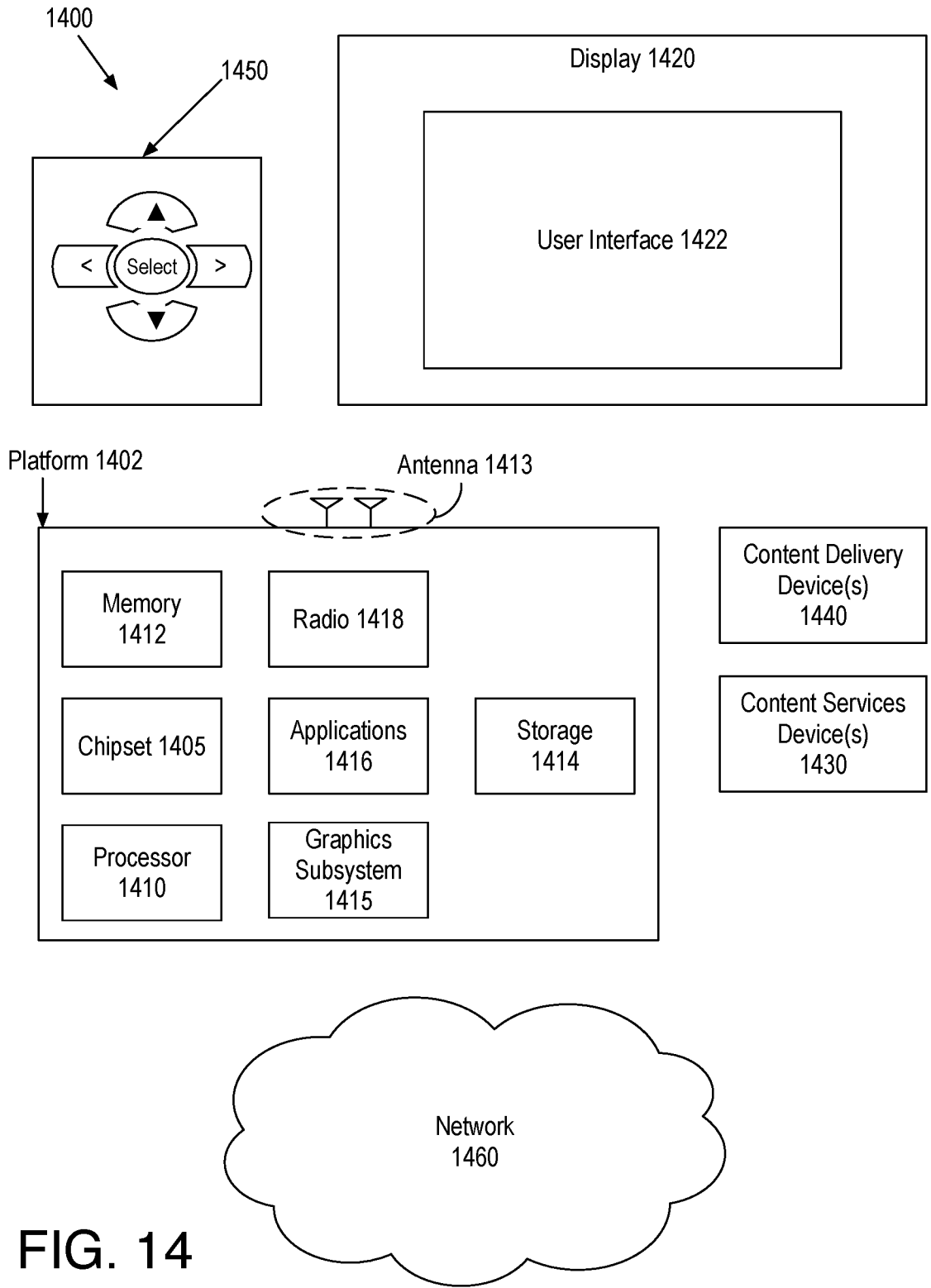
FIG. 14 is an illustrative diagram of an example system.

FIG. 14 is an illustrative diagram of an example system 1400, arranged in accordance with at least some implementations of the present disclosure. In various implementations, system 1400 may be a mobile system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of may be used to interact with user interface 1422, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1420) by movements of a pointer, cursor, focus ring, or other visual indicators displayed on the display. For example, under the control of software applications 1416, the navigation features located on navigation may be mapped to virtual navigation features displayed on user interface 1422, for example. In various embodiments, may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
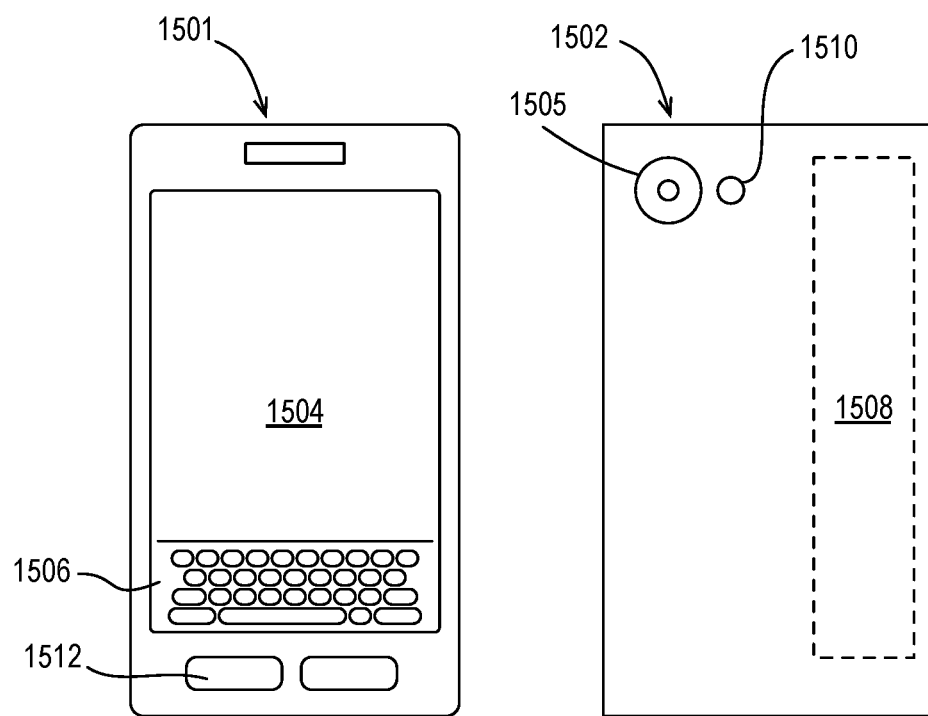
FIG. 15 illustrates an example device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, system 100 or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and flash 1510 may be integrated into front 1501 of device 1500 or both front and back cameras may be provided. Camera 1505 and flash 1510 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for video coding comprises encoding a video at a first resolution and a first bitrate to generate block based coding parameters for the video and a first bitstream, wherein the block based coding parameters are at a block level at the first resolution, translating the block based coding parameters to block based encode controls for encode of the video at a second resolution or a second bitrate, wherein the block based encode controls comprise restrictions to encode decisions at a block level at the first or second resolution, and encoding the video at the second resolution or the second bitrate using the block based encode controls to generate a second bitstream, wherein the second bitstream is independent of the first bitstream.

In one or more second embodiments, further to the first embodiments, the first resolution is greater than the second resolution and the block based encode controls comprise a first restriction to check only inter modes and eliminate checks of intra modes for a first block, a second restriction to check only intra modes and eliminate checks of inter modes for a second block, a third restriction to check only a limited size of coding units for a third block, and a fourth restriction to check only a limited size of transform units for a fourth block.

In one or more third embodiments, further to the first or second embodiments, translating the block based coding parameters to block based encode controls comprises scaling a first motion vector for a first block at the first resolution to a first scaled motion vector at the second resolution and a second motion vector for a second block at the first resolution neighboring the first block to a second scaled motion vector at the second resolution, wherein the first and second motion vectors are different and the first and second scaled motion vectors are the same merging the first and second blocks to a merged block at the second resolution and assigning the first scaled motion vector to the merged block.

In one or more fourth embodiments, further to the first through third embodiments, the first resolution is greater than the second resolution, the first resolution is not directly scalable to the second resolution, and translating the block based coding parameters to block based encode controls comprises determining, for a first block at the second resolution, multiple overlapping blocks at the first resolution and setting, when a mode decision for each of the overlapping blocks is an intra mode, a restriction for the first block to only check intra modes or setting, when the mode decisions for the overlapping blocks are a mix of intra and inter modes, no mode check restriction for the first block.

In one or more fifth embodiments, further to the first through fourth embodiments, translating the block based coding parameters to block based encode controls comprises determining a first block at the first resolution is partitioned into coding units of only a first coding unit size greater than a smallest available coding unit size and setting, in response to the first block being partitioned into coding units of only the first coding unit size, a limited coding unit partition size check for a second block corresponding to the first block at the second resolution to coding units of only a scaled size of the first coding unit size at the second resolution and a second size greater than the scaled size at the second resolution.

In one or more sixth embodiments, further to the first through fifth embodiments, wherein translating the block based coding parameters to block based encode controls comprises determining a second block at the first resolution is partitioned into one or more second coding units of the first coding unit size and one or more third coding units of a second coding unit size smaller than the first coding unit size and setting, in response to the second block being partitioned into the first and second coding units of the first and second unit sizes, respectively, the scaled size of the first coding unit size to corresponding third coding units of a third block corresponding to the first block at the second resolution.

In one or more seventh embodiments, further to the first through sixth embodiments, translating the block based coding parameters to block based encode controls comprises determining a first block at the first resolution has a zero transform unit split depth and setting, in response to the first block having the zero transform unit split depth, a zero transform unit split depth for a third block corresponding to the first block at the second resolution.

In one or more eighth embodiments, further to the first through seventh embodiments, translating the block based coding parameters to block based encode controls comprises determining a first block at the first resolution has a non-zero transform unit split depth and setting, in response to the first block having the non-zero transform unit split depth, a limited transform unit split depth check for a second block corresponding to the first block at the second resolution to check only split depths of one less than the non-zero transform unit split depth and any other available split depths less than the one less than the non-zero transform unit split depth.

In one or more ninth embodiments, further to the first through eighth embodiments, translating the block based coding parameters to block based encode controls comprises determining a first motion vector for a first block at the first resolution and setting, in response to the first motion vector, a limited search region or a fractional search region around the first motion vector for a second block corresponding to the first block at the second resolution.

In one or more tenth embodiments, further to the first through ninth embodiments, translating the block based coding parameters to block based encode controls comprises determining a first frame of the video is a reference frame and a second frame of the video is a non-reference frame and applying more restrictions in the block based encode controls for the second frame relative to the first frame in response to the second frame being a non-reference frame.

In one or more eleventh embodiments, a device or system includes a memory and a processor to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device for video coding comprising:
a memory to store at least a portion of a video; and
one or more processors coupled to the memory, the one or more processors to:
encode the video at a first resolution and a first bitrate to generate block based coding parameters for the video and a first bitstream, wherein the block based coding parameters are at a block level at the first resolution;
translate the block based coding parameters to block based encode controls for encode of the video at a second resolution or a second bitrate, wherein the block based encode controls comprise restrictions to encode decisions at a block level at the first or second resolution, the restrictions comprising a first restriction to check only inter modes and eliminate checks of intra modes for a first block and a second restriction to check only intra modes and eliminate checks of inter modes for a second block; and
encode the video at the second resolution or the second bitrate using the block based encode controls to generate a second bitstream, wherein the second bitstream is independent of the first bitstream.

2. The device of claim 1, wherein the restrictions comprise a third restriction to perform a limited coding unit partition size check for a third block and a fourth restriction to perform a limited transform unit partition size check for a fourth block.

3. The device of claim 1, wherein the one or more processors to translate the block based coding parameters to block based encode controls comprises the processor to:
scale a first motion vector for a third block at the first resolution to a first scaled motion vector at the second resolution and a second motion vector for a fourth block at the first resolution neighboring the first block to a second scaled motion vector at the second resolution, wherein the first and second motion vectors are different and the first and second scaled motion vectors are the same; and
merge the third and fourth blocks to a merged block at the second resolution and assign the first scaled motion vector to the merged block.

4. The device of claim 1, wherein the first resolution is greater than the second resolution, the first resolution is not directly scalable to the second resolution, and the one or more processors to translate the block based coding parameters to block based encode controls comprises the one or more processors to:
determine, for a third block at the second resolution, multiple overlapping blocks at the first resolution; and
set, when a mode decision for each of the overlapping blocks is an intra mode, a restriction for the third block to only check intra modes, or set, when the mode decisions for the overlapping blocks are a mix of intra and inter modes, no mode check restriction for the third block.

5. The device of claim 1, wherein the one or more processors to translate the block based coding parameters to block based encode controls comprises the one or more processors to:
determine a third block at the first resolution is partitioned into coding units of only a first coding unit size greater than a smallest available coding unit size; and
set, in response to the third block being partitioned into coding units of only the first coding unit size, a limited coding unit partition size check for a fourth block corresponding to the third block at the second resolution to coding units of only a scaled size of the first coding unit size at the second resolution and a second size greater than the scaled size at the second resolution.

6. The device of claim 5, wherein the one or more processors to translate the block based coding parameters to block based encode controls further comprises the one or more processors to:
determine a fifth block at the first resolution is partitioned into one or more second coding units of the first coding unit size and one or more third coding units of a second coding unit size smaller than the first coding unit size; and
set, in response to the fifth block being partitioned into the first and second coding units of the first and second unit sizes, respectively, the scaled size of the first coding unit size to corresponding third coding units of a sixth block corresponding to the fifth block at the second resolution.

7. The device of claim 1, wherein the one or more processors to translate the block based coding parameters to block based encode controls comprises the one or more processors to:
determine a third block at the first resolution has a zero transform unit split depth; and
set, in response to the third block having the zero transform unit split depth, a zero transform unit split depth for a fourth block corresponding to the third block at the second resolution.

8. The device of claim 1, wherein the one or more processors to translate the block based coding parameters to block based encode controls comprises the one or more processors to:
determine a third block at the first resolution has a non-zero transform unit split depth; and
set, in response to the third block having the non-zero transform unit split depth, a limited transform unit split depth check for a fourth block corresponding to the third block at the second resolution to check only split depths of one less than the non-zero transform unit split depth and any other available split depths less than the one less than the non-zero transform unit split depth.

9. The device of claim 1, wherein the one or more processors to translate the block based coding parameters to block based encode controls comprises the one or more processors to:
determine a first motion vector for a third block at the first resolution; and
set, in response to the first motion vector, a limited search region or a fractional search region around the first motion vector for a fourth block corresponding to the third block at the second resolution.

10. The device of claim 1, wherein the one or more processors to translate the block based coding parameters to block based encode controls comprises the one or more processors to:
determine a first frame of the video is a reference frame and a second frame of the video is a non-reference frame; and
apply more restrictions in the block based encode controls for the second frame relative to the first frame in response to the second frame being a non-reference frame.

11. A method for video coding comprising:
encoding a video at a first resolution and a first bitrate to generate block based coding parameters for the video and a first bitstream, wherein the block based coding parameters are at a block level at the first resolution;
translating the block based coding parameters to block based encode controls for encode of the video at a second resolution or a second bitrate, wherein the block based encode controls comprise restrictions to encode decisions at a block level at the first or second resolution, the restrictions comprising a first restriction to check only inter modes and eliminate checks of intra modes for a first block and a second restriction to check only intra modes and eliminate checks of inter modes for a second block; and
encoding the video at the second resolution or the second bitrate using the block based encode controls to generate a second bitstream, wherein the second bitstream is independent of the first bitstream.

12. The method of claim 11, wherein the restrictions comprise a third restriction to perform a limited coding unit partition size for a third block and a fourth restriction to perform a limited transform unit partition size check for a fourth block.

13. The method of claim 11, wherein translating the block based coding parameters to block based encode controls comprises:
scaling a first motion vector for a third block at the first resolution to a first scaled motion vector at the second resolution and a second motion vector for a fourth block at the first resolution neighboring the third block to a second scaled motion vector at the second resolution, wherein the first and second motion vectors are different and the first and second scaled motion vectors are the same; and
merging the third and fourth blocks to a merged block at the second resolution and assigning the first scaled motion vector to the merged block.

14. The method of claim 11, wherein the first resolution is greater than the second resolution, the first resolution is not directly scalable to the second resolution, and translating the block based coding parameters to block based encode controls comprises:
determining, for a third block at the second resolution, multiple overlapping blocks at the first resolution; and
setting, when a mode decision for each of the overlapping blocks is an intra mode, a restriction for the third block to only check intra modes, or
setting, when the mode decisions for the overlapping blocks are a mix of intra and inter modes, no mode check restriction for the third block.

15. The method of claim 11, wherein translating the block based coding parameters to block based encode controls comprises:
determining a third block at the first resolution is partitioned into coding units of only a first coding unit size greater than a smallest available coding unit size; and
setting, in response to the third block being partitioned into coding units of only the first coding unit size, a limited coding unit partition size check for a fourth block corresponding to the third block at the second resolution to coding units of only a scaled size of the first coding unit size at the second resolution and a second size greater than the scaled size at the second resolution.

16. The method of claim 11, wherein translating the block based coding parameters to block based encode controls comprises:
- determining a third block at the first resolution has a zero transform unit split depth; and
- setting, in response to the third block having the zero transform unit split depth, a zero transform unit split depth for a fourth block corresponding to the third block at the second resolution.

17. The method of claim 11, wherein translating the block based coding parameters to block based encode controls comprises:
- determining a third block at the first resolution has a non-zero transform unit split depth; and
- setting, in response to the third block having the non-zero transform unit split depth, a limited transform unit split depth check for a fourth block corresponding to the third block at the second resolution to check only split depths of one less than the non-zero transform unit split depth and any other available split depths less than the one less than the non-zero transform unit split depth.

18. At least one non-transitory machine readable medium comprising a plurality of instructions that, in response to being executed on a computing device, cause the computing device to code video by:
- encoding a video at a first resolution and a first bitrate to generate block based coding parameters for the video and a first bitstream, wherein the block based coding parameters are at a block level at the first resolution;
- translating the block based coding parameters to block based encode controls for encode of the video at a second resolution or a second bitrate, wherein the block based encode controls comprise restrictions to encode decisions at a block level at the first or second resolution, the restrictions comprising a first restriction to check only inter modes and eliminate checks of intra modes for a first block and a second restriction to check only intra modes and eliminate checks of inter modes for a second block; and
- encoding the video at the second resolution or the second bitrate using the block based encode controls to generate a second bitstream, wherein the second bitstream is independent of the first bitstream.

19. The non-transitory machine readable medium of claim 18, wherein the restrictions comprise a third restriction to perform a limited coding unit partition size for a third block and a fourth restriction to perform a limited transform unit partition size check for a fourth block.

20. The non-transitory machine readable medium of claim 18, wherein translating the block based coding parameters to block based encode controls comprises:
- scaling a first motion vector for a third block at the first resolution to a first scaled motion vector at the second resolution and a second motion vector for a fourth block at the first resolution neighboring the third block to a second scaled motion vector at the second resolution, wherein the first and second motion vectors are different and the first and second scaled motion vectors are the same; and
- merging the third and fourth blocks to a merged block at the second resolution and assigning the first scaled motion vector to the merged block.

21. The non-transitory machine readable medium of claim 18, wherein the first resolution is greater than the second resolution, the first resolution is not directly scalable to the second resolution, and translating the block based coding parameters to block based encode controls comprises:
- determining, for a third block at the second resolution, multiple overlapping blocks at the first resolution; and
- setting, when a mode decision for each of the overlapping blocks is an intra mode, a restriction for the third block to only check intra modes, or
- setting, when the mode decisions for the overlapping blocks are a mix of intra and inter modes, no mode check restriction for the third block.

22. The non-transitory machine readable medium of claim 18, wherein translating the block based coding parameters to block based encode controls comprises:
- determining a third block at the first resolution is partitioned into coding units of only a first coding unit size greater than a smallest available coding unit size; and
- setting, in response to the third block being partitioned into coding units of only the first coding unit size, a limited coding unit partition size check for a fourth block corresponding to the third block at the second resolution to coding units of only a scaled size of the first coding unit size at the second resolution and a second size greater than the scaled size at the second resolution.

23. The non-transitory machine readable medium of claim 18, wherein translating the block based coding parameters to block based encode controls comprises:
- determining a third block at the first resolution has a zero transform unit split depth; and
- setting, in response to the third block having the zero transform unit split depth, a zero transform unit split depth for a fourth block corresponding to the third block at the second resolution.

24. The non-transitory machine readable medium of claim 18, wherein translating the block based coding parameters to block based encode controls comprises:
- determining a third block at the first resolution has a non-zero transform unit split depth; and
- setting, in response to the third block having the non-zero transform unit split depth, a limited transform unit split depth check for a fourth block corresponding to the third block at the second resolution to check only split depths of one less than the non-zero transform unit split depth and any other available split depths less than the one less than the non-zero transform unit split depth.

\* \* \* \* \*